(12) United States Patent
Suganuma

(10) Patent No.: US 6,639,700 B2
(45) Date of Patent: Oct. 28, 2003

(54) HOLOGRAM RECORDING MEDIUM, HOLOGRAM RECORDING/ RECONSTRUCTING APPARATUS, AND HOLOGRAM RECORDING/ RECONSTRUCTING METHOD

(75) Inventor: Hiroshi Suganuma, Ibaraki (JP)

(73) Assignee: Sony Corporation, Tokyo (JP)

( * ) Notice: Subject to any disclaimer, the term of this patent is extended or adjusted under 35 U.S.C. 154(b) by 5 days.

(21) Appl. No.: 09/994,270

(22) Filed: Nov. 26, 2001

(65) Prior Publication Data

US 2002/0101629 A1 Aug. 1, 2002

(30) Foreign Application Priority Data

Nov. 27, 2000 (JP) ........................................ 2000-360262

(51) Int. Cl.$^7$ .................................................. G03H 1/04
(52) U.S. Cl. .................. 359/35; 359/1; 359/8; 359/22; 359/25; 430/1; 428/64.4; 428/64.9
(58) Field of Search ............................ 359/35, 1, 8, 25, 359/29, 30, 22; 365/125

(56) References Cited

U.S. PATENT DOCUMENTS 6,038,043 A * 3/2000 Bahuguna ...................... 359/30
6,156,415 A * 12/2000 Campbell ..................... 428/212
6,320,708 B1 * 11/2001 Ueyanagi ...................... 359/824

* cited by examiner

Primary Examiner—John Juba
Assistant Examiner—Leo Boutsikaris
(74) Attorney, Agent, or Firm—Sonnenschein, Nath & Rosenthal LLP

(57) ABSTRACT

A hologram recording medium comprises a hologram recording layer for recording a hologram, and a wedge substrate for varying the propagating direction of a reference light and an object light incident upon the hologram recording medium. By rotating the hologram recording medium comprising the hologram recording layer and the wedge substrate, the propagating direction of the reference light and the object light are varied, whereby angle multiplex recording of holograms can be realized with ease.

10 Claims, 20 Drawing Sheets

HOLOGRAM RECORDING MEDIUM, HOLOGRAM RECORDING/ RECONSTRUCTING APPARATUS, AND HOLOGRAM RECORDING/ RECONSTRUCTING METHOD

RELATED APPLICATION DATA

The present application claims priority to Japanese Application(s) No(s). P2000-360262 filed Nov. 27, 2000, which application(s) is/are incorporated herein by reference to the extent permitted by law.

BACKGROUND OF THE INVENTION

1. Field of the Invention

The present invention relates to a hologram recording medium for recording an information signal in the form of optical phase information. The present invention also relates to a hologram recording/reconstructing apparatus and method for recording and/or reconstructing an information signal in the form of optical phase information.

2. Description of the Related Art

A conventional hologram recording medium is formed of, e.g., a film or a disk. A reference light and an object light, which are each given as a coherent laser beam, are irradiated to a hologram recording medium, whereupon the hologram recording medium records an information signal, which is to be recorded, as an interference pattern of the reference light and the object light, i.e., as phase information of the reference light and the object light. The object light contains an information signal in the form of optical phase information, and is provided as a laser beam reflected from an object or a laser beam modulated by a spatial modulator. Also, a hologram is reconstructed from a hologram recording medium when it is irradiated by the reference light or a reconstruction light that is phase conjugate to the reference light.

There are many reports related to hologram recording/ reconstructing apparatuses using disk-shaped hologram recording mediums. For example, U.S. Pat. No. 5,671,073 proposes a method of multiplex-recording holograms with rotation of a disk-shaped hologram recording medium by using a spherical wave as a reference light (hereinafter referred to as "shift multiplex recording").

Recently, one example of hologram recording mediums obtained by machining a crystal into a disk-like shape has also been reported (Tao Shiquan et al. "Multi-track storage of 10,000 holograms in a disk-type photorefractive crystal," SPIE Vol. 3864, pp. 270 (1999)).

Another conventional method of recording holograms in a hologram recording medium is one for multiplex-recording holograms based on changes of the incident angle of each of a reference light and/or an object light with respect to the hologram recording medium (hereinafter referred to as "angle multiplex recording").

In the angle multiplex recording, the incident angle of each of a reference light and/or an object light upon a hologram recording medium must be changed using a beam deflector or the like.

To perform the angle multiplex recording on a hologram recording medium, various methods using a beam deflector are known for changing the incident angles of a reference light and/or an object light.

Methods for changing the incident angle of each of a reference light and/or an object light by a beam deflector include one of mechanically controlling the incident angle by using a galvanometric mirror or the like, and another one of electrically controlling the incident angle by using an acousto-optical deflector (hereinafter referred to as an "AOD"), an electro-optical deflector (hereinafter referred to as an "EOD"), or the like.

Assuming here that the aperture width of a beam deflector is D, the aperture shape factor is a (1.22 for a circular shape and 1 for a rectangular shape), the wavelength of a reference light and/or an object light irradiated to a hologram recording medium is λ, and the angle amplitude of the reference light and/or the object light is φ, the number N of resolving points of a beam deflector is given by the following formula 1:

$$N = \frac{\phi D}{a\lambda} \tag{1}$$

From the formula 1, it is understood that the number N of resolving points increases as the aperture width D has a larger value and the angle amplitude φ of the reference light and/or the object light has a larger value. Because the product of incident height and incident angle of the reference light and/or the object light at each plane is constant based on the Lagrange-Helmholtz relationship, the number N of resolving points remains the same even when beam shaping optical systems are disposed before and after the beam deflector.

Still another method for changing the incident angle of each of a reference light and/or an object light irradiated to a hologram recording medium is one of deflecting a beam with a wedge-shaped prism. In other words, it is known that the direction in which a reference light and/or an object light propagates can be changed in small amount and can be adjusted in small angle by rotating a wedge-shaped prism. Accordingly, the reference light and/or the object light can be deflected in any desired direction. Then, by setting an apical angle of the wedge-shaped prism to a smaller value, a deflection angle due to the prism rotation can be reduced. This method is therefore effective in adjusting the direction, in which the reference light and/or the object light propagates, in small angle.

New methods for hologram multiplex recording have also been proposed recently. One example of those methods is the so-called peristrophic multiplex recording described below in detail (Kevin Curtis et al. "Method for holographic storage using peristrophic multiplexing," 19, Opt. Lett. 993 (1994) and A. Pu et al. "High density holographic storage in thin film," SPIE Vol. 2338, Optical Data Storage (1994), 69).

In the peristrophic multiplex recording, as shown in FIG. 33, multiplex recording of holograms is realized by rotating a reference light 41 in the direction of an arrow R2 along a conical surface with its apex defined by a part of a disk-shaped hologram recording medium 40.

Also, in the peristrophic multiplex recording, the degree of multiplexity can be further increased by changing the incident angle of the reference light 41 upon the hologram recording medium 40 in the direction of an arrow R3 so that the above-mentioned angle multiplex recording of holograms is realized in the direction of radius vector in a combined manner.

Assuming here that the Bragg angle is dθ, the wavelength is λ, the thickness of the hologram recording medium 40 is t, the incident angle of the reference light 41 upon the hologram recording medium 40 is $\theta_R$, and the incident angle of an object light 42 upon the hologram recording medium

40 is $\theta_S$, the Bragg angle is $d\theta$ in the peristrophic multiplex recording is given by the following formula 2:

$$d\theta = \sqrt{\frac{2\lambda}{t} \frac{\cos\theta_s}{\sin\theta_R(\sin\theta_R + \sin\theta_s)}} \quad (2)$$

Additionally, in usual angle multiplex recording of holograms, the Bragg angle $d\theta'$ is given by the following equation 3 wherein the refractive index of the hologram recording medium 40 is n:

$$d\theta' = \frac{\lambda \cdot \cos\theta_s}{n \cdot t \cdot \sin(\theta_R + \theta_s)} \quad (3)$$

As conventional methods for reconstructing holograms from a hologram recording medium, there is known a phase conjugate reconstructing method which employs, as a reconstruction light, a phase conjugate light having the same phase as a reference light but propagating in an opposite direction to the reference light. A method for generating a phase conjugate light to perform the phase conjugate reconstruction is practiced, for example, by splitting an irradiated reference light with a beam splitter and creating an optical path separate from the reference light irradiated for recording holograms.

When recording and/or reconstructing holograms using the conventional hologram recording mediums described above, however, the number N of resolving points obtained with the methods using an AOD and an EOD as beam deflectors are about 1000 or several tens, respectively. Those methods have limitations in further increasing the degree of multiplexity in excess of the respective number N of resolving points. Another problem is that, to maximize the recording density while minimizing crosstalk noise, the deflection angles of the reference light and/or the object light must be controlled with accuracy on an order of several-thousandths of one degree.

Also, the method of mechanically controlling the incident angle by using a galvanometric mirror or the like, which serves as a beam deflector, has a problem in that a deterioration occurs in reproducibility due to, e.g., a backlash, in resolution accuracy, and in stability against disturbances.

The peristrophic multiplex recording has a problem in that a complicated and relatively large-size device is needed for deflecting the reference light.

The phase-conjugate reconstructing method has problems in that an optical system having an increased size is required to provide a separate optical path for generating the reconstruction light, and a beam deflector for the reference light must be disposed in each optical path when carrying out angle multiplex recording of holograms.

SUMMARY OF THE INVENTION

In view of the state of the art set forth above, it is an object of the present invention to control the deflection angle of each of a reference light and an object light incident upon a hologram recording medium with higher accuracy, to improve the degree of multiplexity in recording of holograms, and to increase the recording capacity of the hologram recording medium.

To achieve the above object, the present invention provides a hologram recording medium for recording an information signal in the form of optical phase information upon irradiation of a reference light and an object light while the hologram recording medium is rotated. The hologram recording medium has a first primary surface parallel to a plane in which the hologram recording medium is rotated, and a second primary surface inclined relative to the first primary surface. At least one of the reference light and the object light is irradiated through the second primary surface, and the hologram recording medium has light transparency allowing at least a part of the irradiated reference light and object light to pass therethrough.

With the hologram recording medium having the above features of the present invention, the reference light irradiated to the hologram recording medium is deflected with rotation of the hologram recording medium, whereby an information signal can be recorded as phase information of the reference light and the object light through angle multiplex recording. As a result, the recording density can be improved.

Also, the present invention provides a hologram recording/reconstructing apparatus for recording and/or reconstructing an information signal in the form of optical phase information by irradiating a reference light and an object light to a hologram recording medium. The apparatus comprises a driving system for rotating the hologram recording medium; an optical system having a light source for outputting the reference light and the object light, and irradiating the reference light and the object light to a hologram recording medium having a first primary surface parallel to a plane in which the hologram recording medium is rotated, and a second primary surface inclined relative to the first primary surface, at least one of the reference light and the object light being irradiated through the second primary surface, the hologram recording medium having light transparency allowing at least a part of the irradiated reference light and object light to pass therethrough; and a control unit for controlling the driving system and the optical system.

Further, the present invention provides a hologram recording/reconstructing method for recording and/or reconstructing an information signal in the form of optical phase information by irradiating a reference light and an object light to a hologram recording medium. The method comprising the steps of rotating a hologram recording medium having a first primary surface parallel to a plane in which the hologram recording medium is rotated, and a second primary surface inclined relative to the first primary surface, at least one of the reference light and the object light being irradiated through the second primary surface, the hologram recording medium having light transparency allowing at least a part of the irradiated reference light and object light to pass therethrough; and irradiating the reference light and the object light to the hologram recording medium, thereby recording and/or reconstructing an information signal in the form of optical phase information.

With the hologram recording/reconstructing apparatus and method having the above features of the present invention, by irradiating the reference light to the hologram recording medium of the present invention, an information signal can be recorded and/or reconstructed in the form of optical phase information. Then, when performing angle multiplex recording of information signals in the form of optical phase information, the accuracy in control of an angle, at which the reference light is deflected, can be improved, and therefore the recording density can be increased.

DESCRIPTION OF THE PREFERRED EMBODIMENTS

A hologram recording medium according to the present invention will be described below in detail with reference to the drawings in connection with the case in which the present invention is applied to a substantially disk-shaped hologram recording medium.

Holograms are recorded in and/or reconstructed from the hologram recording medium using a hologram recording/reconstructing apparatus and method according to the present invention. The hologram recording/reconstructing apparatus and method are also included in the following description.

The hologram recording medium according to the present invention will be described below in connection with first and second embodiments.

Figure 1:
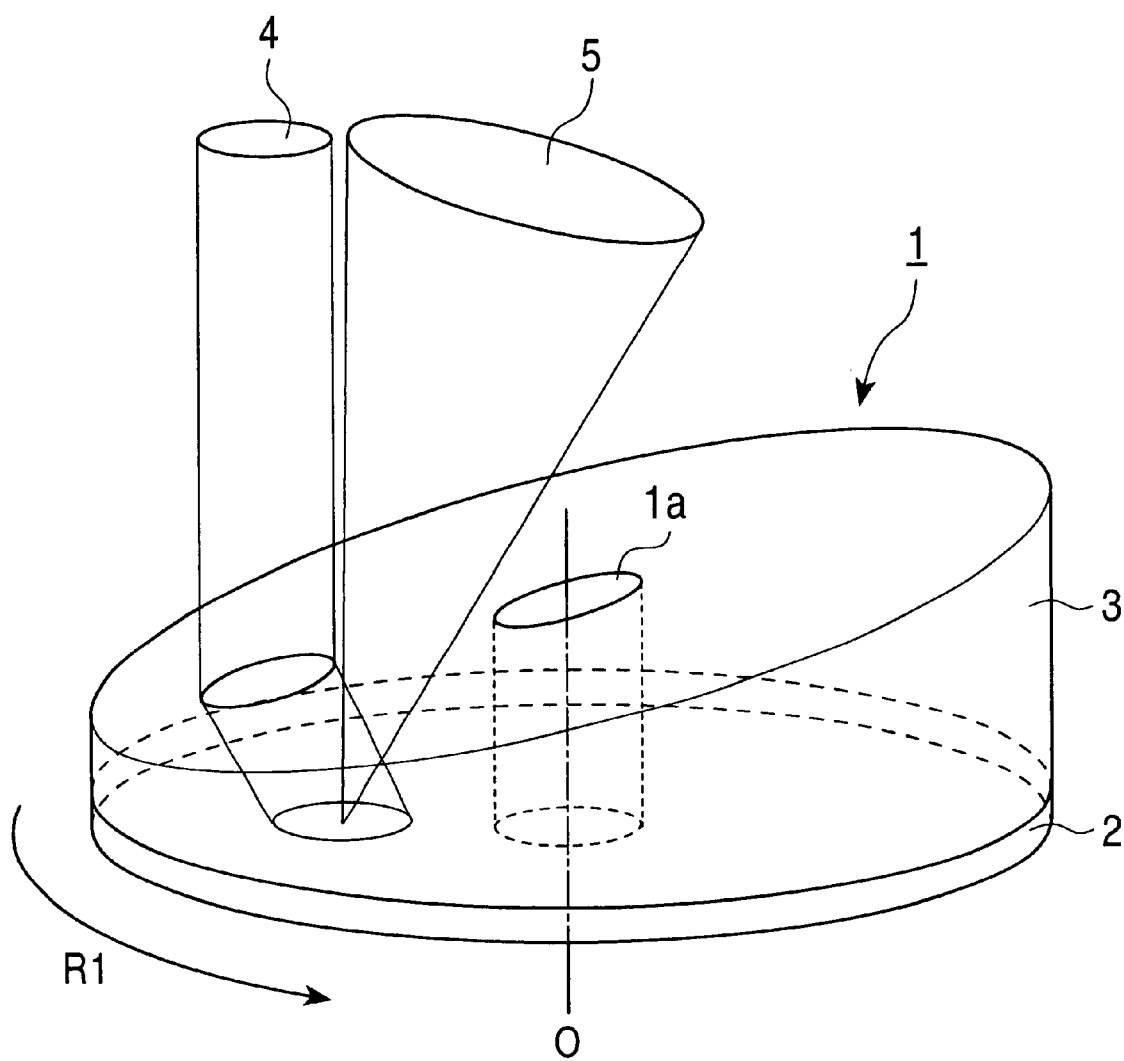
FIG. 1 is a schematic perspective view showing a hologram recording medium having a hologram recording layer, as a first embodiment of the present invention, in the condition in which a reference light and an object light are incident upon the hologram recording medium.

As shown in FIG. 1, a hologram recording medium 1 of the first embodiment is substantially in the form of a disk, as a whole, having an opening 1a formed at the center, and comprises a hologram recording layer 2 and a wedge substrate 3. In the recording/reconstructing mode, the hologram recording medium 1 is rotated in the direction of arrow R1, for example, about an axis O. The hologram recording medium 1 has a first primary surface parallel to the plane in which the hologram recording medium 1 is rotated, and a second primary surface inclined relative to the first primary surface.

A hologram recording layer 2 is disposed on the first primary surface of the hologram recording medium 1, which is parallel to the plane in which the hologram recording medium 1 is rotated. A reference light 4 and an object light 5, which are each provided as a coherent laser beam, are irradiated to the hologram recording layer 2, whereupon the hologram recording layer 2 records, as an interference pattern of the reference light 4 and the object light 5, an information signal to be recorded. The interference pattern contains phase information of the reference light 4 and the object light 5 irradiated to the hologram recording medium 1.

The hologram recording layer 2 can be made of any of materials capable of recording holograms therein. For example, organic recording materials, such as a photopolymer and a liquid crystal, are preferably employed.

The wedge substrate 3 has a first primary surface parallel to the plane in which the hologram recording medium 1 is rotated, and a second primary surface inclined relative to the first primary surface. The wedge substrate 3 is disposed such that the first primary surface forms a bottom surface and is positioned in contact with the hologram recording layer 2. Since the second primary surface is inclined relative to the first primary surface, the wedge substrate 3 has the function of a prism. Hence, the wedge substrate 3 deflects the irradiated reference light 4 by refracting the light at its incident surface and allowing it to pass therethrough.

The wedge substrate 3 can be made of any desired material so long as the material is permeable to both the reference light 4 and the object light 5.

The reference light 4 and the object light 5 are each provided as a coherent laser beam, and are irradiated from a laser beam source (not shown) of a hologram recording/reconstructing apparatus, described later, to the hologram recording medium 1 for recording a hologram. The object light 5 contains an information signal, which is to be recorded, in the form of optical phase information.

The hologram recording medium 1 having the above-described structure is rotated in the direction of arrow R1, for example, about the axis O. During the rotation, the hologram recording medium 1 is chucked, for example, by the hologram recording/reconstructing apparatus at the opening 1a. Because of the wedge substrate 3 functioning as a prism, the direction, in which an apical angle of the prism defined by the wedge substrate 3 locates, is also rotated while the hologram recording medium 1 rotates. Therefore, an incident angle is varied when the reference light 4 irradiated from the laser beam source to the hologram recording medium 1 enters the wedge substrate 3, so that the reference light 4 is deflected in the wedge substrate 3.

How the reference light 4 is deflected with the rotation of the hologram recording medium 1 is shown in sectional views of FIGS. 2 to 5.

Figure 2:
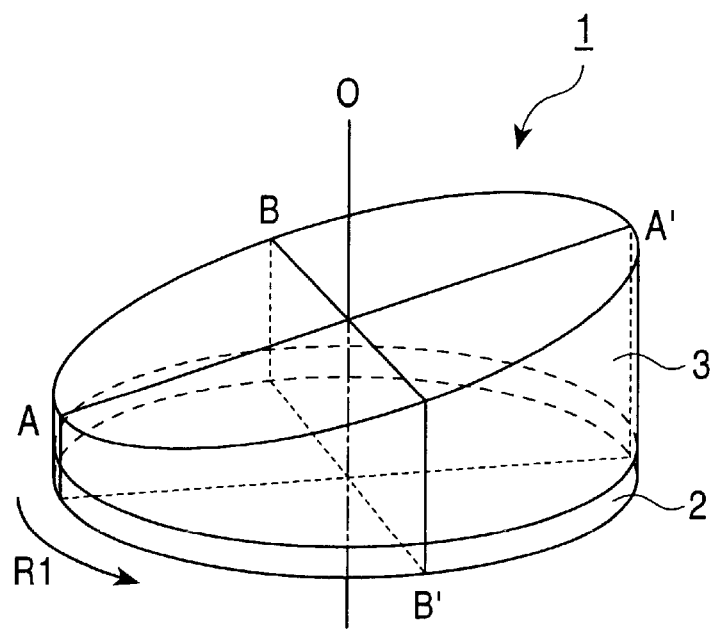
FIG. 2 is a schematic perspective view showing the hologram recording medium having the hologram recording layer according to the present invention.
Figure 3:
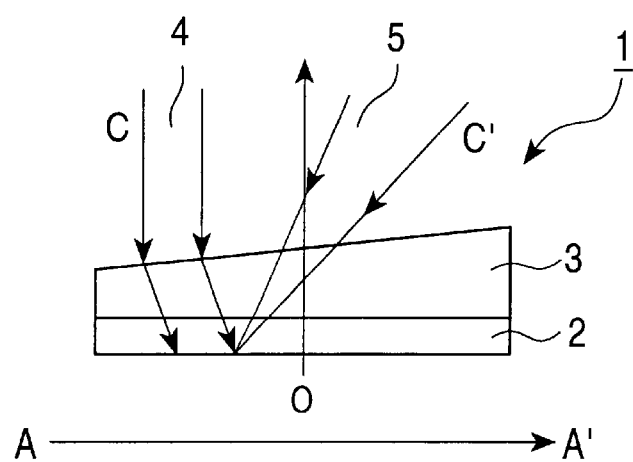
FIG. 3 is a schematic vertical sectional view showing optical paths when the reference light and the object light are incident upon the hologram recording medium having the hologram recording layer according to the present invention.

First, FIG. 3 shows a section taken along line A–A' in FIG. 2. The reference light 4 irradiated toward the hologram recording medium 1 enters the wedge substrate 3 through an optical path indicated by arrow C. The reference light 4 having entered the wedge substrate 3 is deflected in its propagating direction at an incident surface of the wedge substrate 3, and then reaches the hologram recording layer 2.

In the state of FIG. 3, the object light 5 irradiated toward the hologram recording medium 1 enters the wedge substrate 3 through an optical path indicated by arrow C', and then reaches the hologram recording layer 2.

Figure 4:
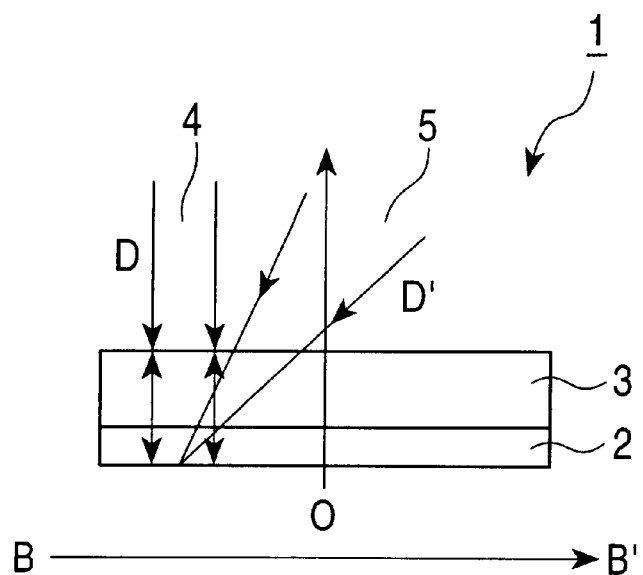
FIG. 4 is a schematic vertical sectional view showing optical paths when the reference light and the object light are incident upon the hologram recording medium having the hologram recording layer according to the present invention.

Next, FIG. 4 shows a section taken along line B–B' in FIG. 2, i.e., a section resulted by rotating the hologram recording medium 1 through 90 degrees from the state of FIG. 3 in the direction of arrow R1 while the position where the reference light 4 is irradiated is kept fixed. The reference light 4 irradiated toward the hologram recording medium 1 enters the wedge substrate 3 through an optical path indicated by arrow D. The reference light 4 having entered the wedge substrate 3 is deflected at the incident surface of the wedge substrate 3, and then reaches the hologram recording layer 2.

In the state of FIG. 4, the object light 5 irradiated toward the hologram recording medium 1 enters the wedge substrate 3 through an optical path indicated by arrow D', and then reaches the hologram recording layer 2.

Figure 5:
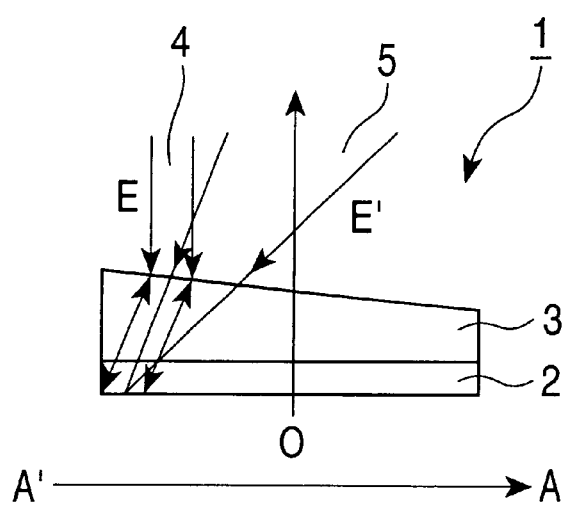
FIG. 5 is a schematic vertical sectional view showing optical paths when the reference light and the object light are incident upon the hologram recording medium having the hologram recording layer according to the present invention.

Next, FIG. 5 shows a section taken along line A'–A in FIG. 2 that is a reversal to the section of FIG. 3, i.e., a section resulted by rotating the hologram recording medium 1 through 180 degrees from the state of FIG. 3 in the direction of arrow R1 while the position where the reference light 4 is irradiated is kept fixed. The reference light 4 irradiated toward the hologram recording medium 1 enters the wedge substrate 3 through an optical path indicated by arrow E. The reference light 4 having entered the wedge substrate 3 is deflected at the incident surface of the wedge substrate 3, and then reaches the hologram recording layer 2.

In the state of FIG. 5, the object light 5 irradiated toward the hologram recording medium 1 enters the wedge substrate 3 through an optical path indicated by arrow E', and then reaches the hologram recording layer 2.

Next, in a section taken along line B'–B in FIG. 2 that is a reversal to the section of FIG. 4, i.e., in a section resulted by rotating the hologram recording medium 1 through 270 degrees from the state of FIG. 3 in the direction of arrow R1 while the position where the reference light 4 is irradiated is kept fixed, the reference light 4 and the object light 5 behave substantially in the same manner as those in the state of FIG. 4, and hence a description is not repeated here.

Thus, by rotating the hologram recording medium 1, the propagating direction of the reference light 4 irradiated to the hologram recording medium 1 can be deflected at the incident surface of the wedge substrate 3. After recording an information signal as one hologram and then rotating the hologram recording medium 1 through an angle to such an extent that the Bragg condition for the previously recorded hologram is no longer satisfied, a subsequent information signal is recorded as another hologram. In the reconstruction mode, by irradiating a reconstruction light (not shown) to the hologram recording medium 1, the recorded object light 5 is reconstructed and the information signal is reproduced from the recorded hologram.

The reference light 4 or a phase conjugate light, which is provided as a laser beam in a phase conjugate relation to the reference light 4, can be employed as the reconstruction light. The reconstruction light is outputted from the laser beam source of the hologram recording/reconstructing apparatus described later.

Figure 6:
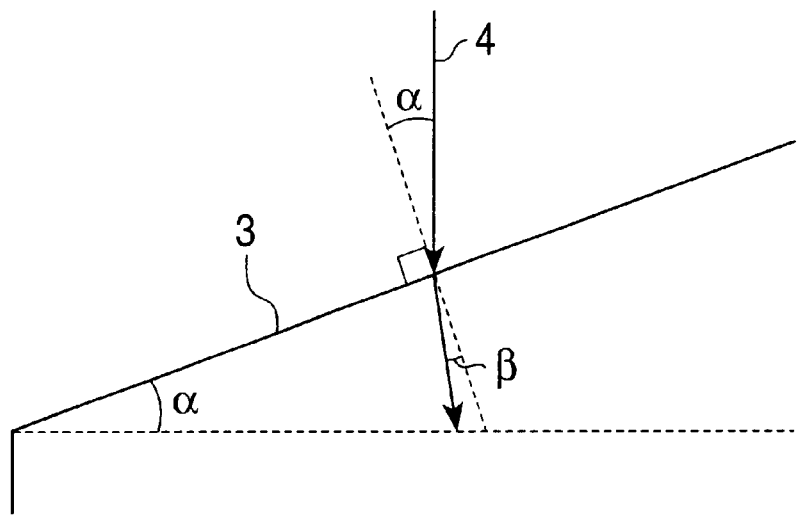
FIG. 6 is a schematic vertical sectional view showing the condition in which the reference light is incident upon a wedge substrate of the hologram recording medium according to the present invention.
Figure 7:
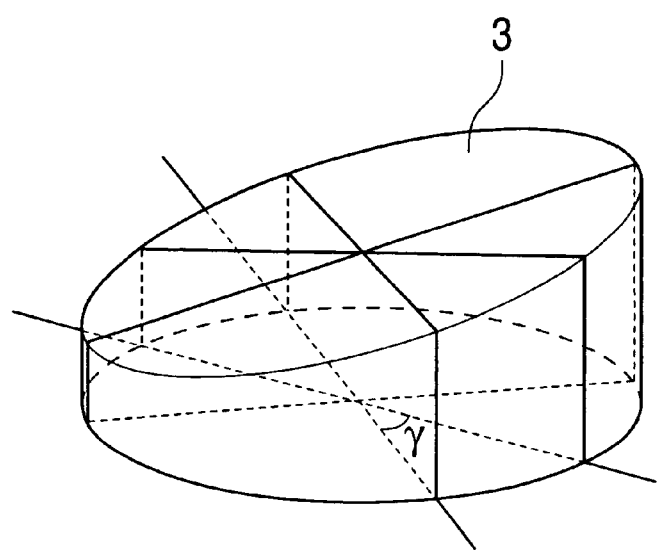
FIG. 7 is a schematic perspective view of the wedge substrate of the hologram recording medium according to the present invention.
Figure 8:
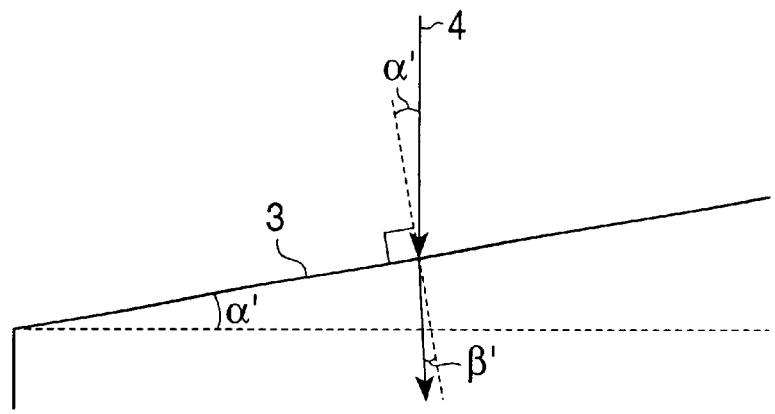
FIG. 8 is a schematic vertical sectional view showing the condition in which the reference light is incident upon the wedge substrate of the hologram recording medium according to the present invention.

FIGS. 6 to 8 show the relationship between the apical angle of the prism of the wedge substrate 3 and the deflection angle occurred in the hologram recording medium 1. Assuming that the reference light 4 is vertically incident upon the bottom surface of the hologram recording medium 1, the apical angle of the wedge substrate 3 is $\alpha$, the angle formed between the direction, in which the reference light 4 is deflected in the wedge substrate 3, and the normal line to the second primary surface of the hologram recording medium 1 is $\beta$, and the refractive index of the wedge substrate 3 is n, $\sin \alpha$ can be expressed by the following formula 4:

$$\sin \alpha = n \cdot \sin \beta \quad (4)$$

Assuming that the angle measured counterclockwise from a direction (0 degree) perpendicular to the diametrical direction of the wedge substrate 3 passing the prism apex is $\gamma$, the apical angle of the wedge substrate 3 in a $\gamma$-plane is $\alpha'$, and the angle formed between the reference light 4 and the normal line to the second primary surface of the hologram recording medium 1 is $\beta'$, $\tan \alpha'$ and $\sin \alpha'$ can be expressed respectively by the following formulae 5 and 6:

$$\tan \alpha' = \tan \alpha \times \sin \gamma \quad (5)$$

$$\sin \alpha' = n \cdot \sin \beta' \quad (6)$$

Figure 9:
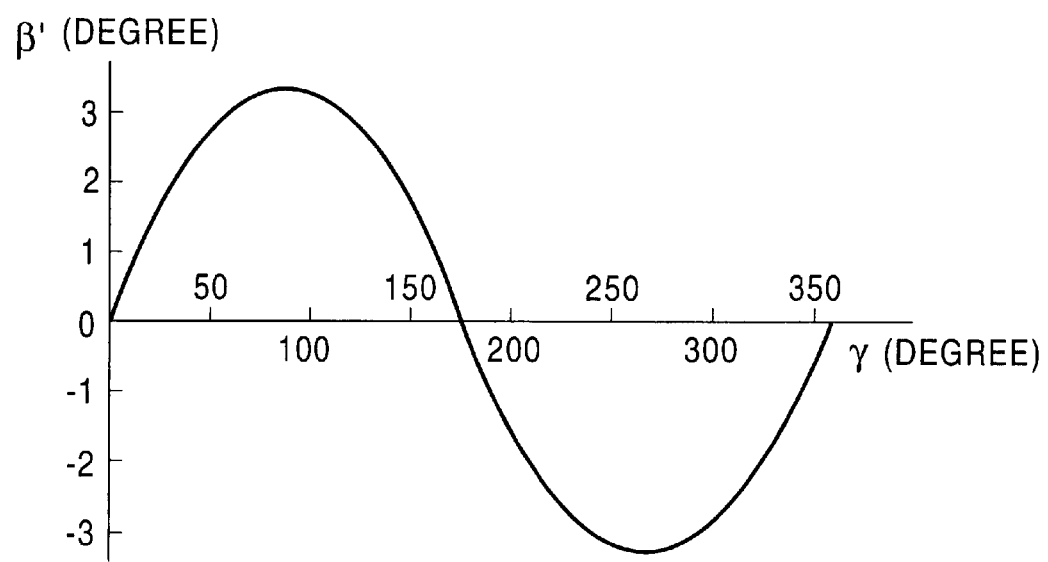
FIG. 9 is a graph showing changes of the deflection angle of the reference light caused upon rotation of the wedge substrate of the hologram recording medium according to the present invention.

FIG. 9 is a graph showing a result obtained by solving those simultaneous equations for the case of $\alpha = 5$ degrees and $n = 1.5$. As seen from the graph, while the hologram recording medium 1 is rotating once, $\beta'$ varies in the range of $\pm 3.33$ degrees. By performing the angle multiplex recording in units of five-thousandths of one degree under that condition, about 2500 holograms can be multiplex-recorded along a circumference during one rotation of the hologram recording medium 1 from theoretical calculation.

Figure 10:
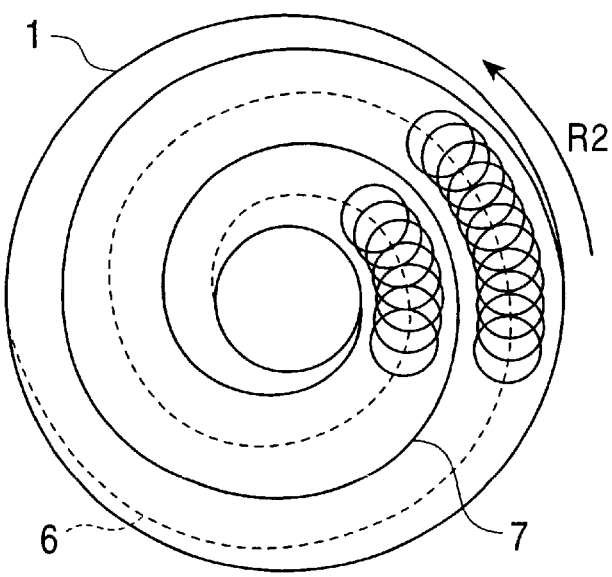
FIG. 10 is a schematic view showing one example of a track structure of the hologram recording medium according to the present invention.
Figure 11:
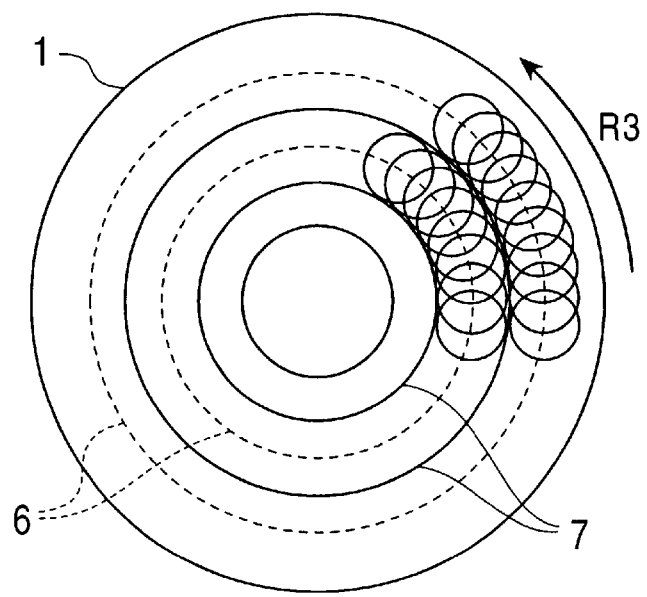
FIG. 11 is a schematic view showing one example of a track structure of the hologram recording medium according to the present invention.

A region corresponding to one circumference, along which holograms are multiplex-recorded, defines one track. Then, as shown in FIGS. 10 and 11, the hologram recording medium 1 can record holograms successively in a spiral track indicated by arrow R2 or in concentric tracks indicated by arrow R3. By forming a track structure 6 made up of, e.g., 400 concentric tracks, a total of 1,000,000 holograms can be multiplex-recorded in the hologram recording medium 1.

In the case of not employing an angle deflection method using, e.g., a beam deflector or a wavelength varying method using a wavelength variable laser beam source or a plurality of laser beam sources, those methods being conventionally used, the respective tracks must be completely separated from each other. More specifically, if adjacent tracks are recorded in an overlapped relation, the reconstruction light would be irradiated to both the tracks when reconstructing the recorded holograms, because the adjacent tracks are recorded using the same reference light 4. Hence, a plurality of holograms would be reconstructed at the same time. By employing the conventional angle deflection method or wavelength varying method in a combined manner, however, holograms can also be multiplex-recorded in the direction of radius vector, and the degree of multiplexity, i.e., the recording density, can be further increased.

Additionally, as shown in FIGS. 10 and 11, a groove 7 may be provided between the adjacent tracks as with a conventional optical disk for the purpose of properly positioning a laser beam in the recording or reconstructing mode.

With the hologram recording medium 1 of the first embodiment of the present invention, as described above, the wedge substrate 3 of the hologram recording medium 1 has the first primary surface and the second primary surface. By rotating the hologram recording medium 1, the propagating direction of the reference light 4 incident upon the wedge substrate 3 is deflected so that the angle multiplex recording of holograms can be performed on the hologram recording layer 2. Also, the deflection angle of the reference light 4 can be precisely controlled without increasing the size of the hologram recording/reconstructing apparatus.

Further, the recorded holograms are reconstructed from the hologram recording medium 1 by irradiating, as the reconstruction light, the reference light 4 or a laser beam that is phase conjugate to the reference light 4

The accuracy in control of the deflection angle of the reference light 4 is improved by rotating the hologram recording medium 1 for deflection of the reference light 4, as with the case of rotating a prism, rather than employing a conventional angle deflecting means with a beam deflector or the like.

Figure 12:
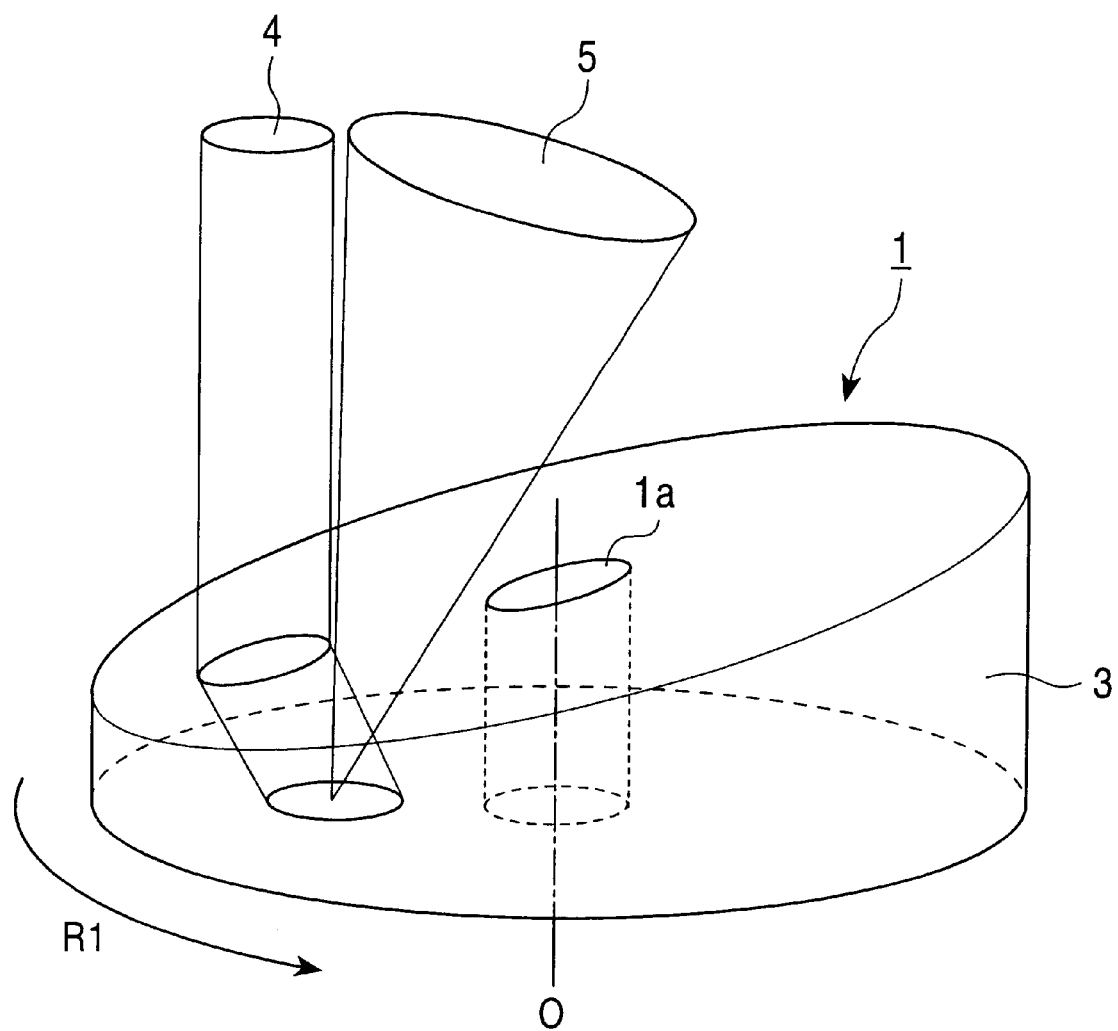
FIG. 12 is a schematic perspective view showing a hologram recording medium, as a second embodiment of the present invention, in the condition in which the reference light and the object light are incident upon the hologram recording medium.

As shown in FIG. 12, a hologram recording medium 1 of a second embodiment of the present invention is substantially in the form of a disk, as a whole, having an opening 1a formed at the center, and is constituted by a wedge substrate 3. In the recording/reconstructing mode, the hologram recording medium 1 is rotated in the direction of arrow R1, for example, about an axis O. The hologram recording medium 1 has a first primary surface parallel to the plane in which the hologram recording medium 1 is rotated, and a second primary surface inclined relative to the first primary surface. Note that the following description is made of only different features from those of the first embodiment, and the remaining similar features are not described herein.

The wedge substrate 3 is substantially in the form of a disk, and has a first primary surface parallel to the plane in which the hologram recording medium 1 is rotated, and a second primary surface inclined relative to the first primary surface.

A reference light 4 and an object light 5, which are each provided as a coherent laser beam, are irradiated to the wedge substrate 3, whereupon the wedge substrate 3 records, as an interference pattern of the reference light 4 and the object light 5, an information signal to be recorded.

Further, the wedge substrate 3 has the function of a prism, and deflects the reference light 4 and the object light 5, which are incident upon the wedge substrate 3, by refracting the light at an incident surface and allowing it to pass therethrough.

The wedge substrate 3 can be made of any of inorganic recording materials such as photorefractive crystals doped with, e.g., an alloy of Fe, Ce, Pr or Fe and Mn. Preferable examples of the photorefractive crystals include, e.g., $LiNbO_3$ and $LiTaO_3$.

The hologram recording medium 1 thus constructed is rotated in the direction of arrow R1 about the axis O similarly to the above-described hologram recording medium 1 having the hologram recording layer 2.

The directions in which the reference light 4 and the object light 5 are deflected when the hologram recording medium 1 is rotated are substantially the same as those resulting in the first embodiment, i.e., in the hologram recording medium 1 having the hologram recording layer 2, and hence are not described herein.

When the hologram recording medium 1 has the hologram recording layer 2 like the first embodiment, holograms are recorded in the hologram recording layer 2. In contrast, when the hologram recording medium 1 does not have the hologram recording layer 2 like the second embodiment, holograms are recorded in the wedge substrate 3. In other words, the wedge substrate 3 is entirely employed as a recording area.

In the latter case, however, when the hologram recording medium 1 is made of a material having a birefringent characteristic, such as a double refracting crystal, a due care must be paid to the polarization direction of a laser beam used for recording and/or reconstructing holograms and the azimuth of the crystal axis. Stated otherwise, the polarization direction and the crystal azimuth are desirably selected so that a laser beam used for recording and/or reconstructing holograms propagate in the hologram recording medium 1 as a specific polarized light.

For example, in the case of employing a crystal of lithium niobate ($LiNbO_3$) which is a photorefractive crystal most commonly used, the c-axis of the crystal is set to orient in a direction vertical to the bottom surface of the wedge substrate 3 such that the reference light 4 and the object light 5 propagate as ordinary rays.

With the hologram recording medium 1 of the second embodiment of the present invention, as described above, since the hologram recording medium 1 is constituted by the wedge substrate 3, a hologram can be recorded while deflecting the reference light 4 incident upon the wedge substrate 3. Then, since the incident angle of the reference light 4 upon the hologram recording medium 1 is varied by rotating the hologram recording medium 1, the angle multiplex recording of holograms can be easily performed without needing an optical system for varying the incident angle of the reference light 4.

Also, the recorded holograms are reconstructed from the hologram recording medium 1 by irradiating, as the reconstruction light, the reference light 4 or a laser beam that is phase conjugate to the reference light 4

The accuracy in control of the deflection angle of the reference light 4 can be improved by rotating the hologram recording medium 1 for deflection of the reference light 4, as with the case of rotating a prism, rather than employing a conventional angle deflecting means with a beam deflector or the like.

The hologram recording medium 1 according to the present invention may have a reflective layer for reflecting the reference light 4. A hologram recording medium having a reflective layer will be described below. Note that, unless specifically otherwise mentioned, the above description of the hologram recording medium 1 not having a reflective layer is similarly applied to hologram recording mediums described below.

A reflective layer is disposed on the first primary surface of the hologram recording medium 1 parallel to the plane in which the hologram recording medium 1 is rotated, and is substantially in the form of a circular disk. The reflective layer is able to reflect the reference light 4 irradiated through the second primary surface inclined relative to the first primary surface of the hologram recording medium 1. The reflective layer can be formed of a plane mirror or corner cubes.

Figure 13:
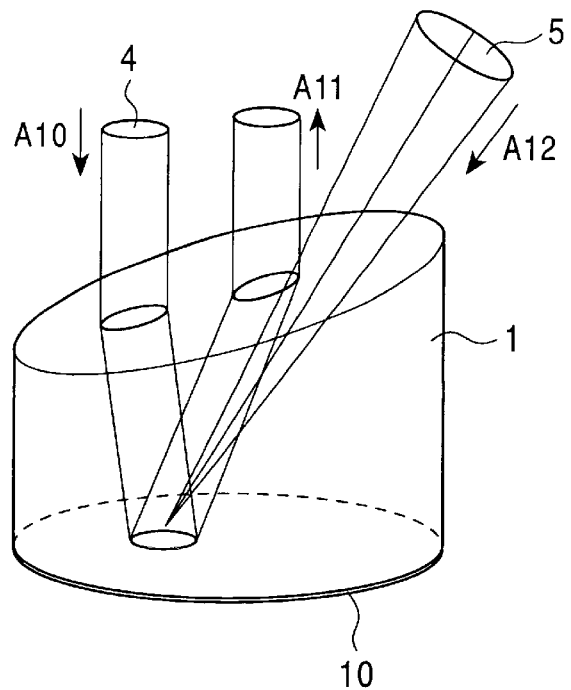
FIG. 13 is a schematic perspective view showing optical paths when the reference light and the object light are incident upon a hologram recording medium having a reflection surface according to the present invention.
Figure 14:
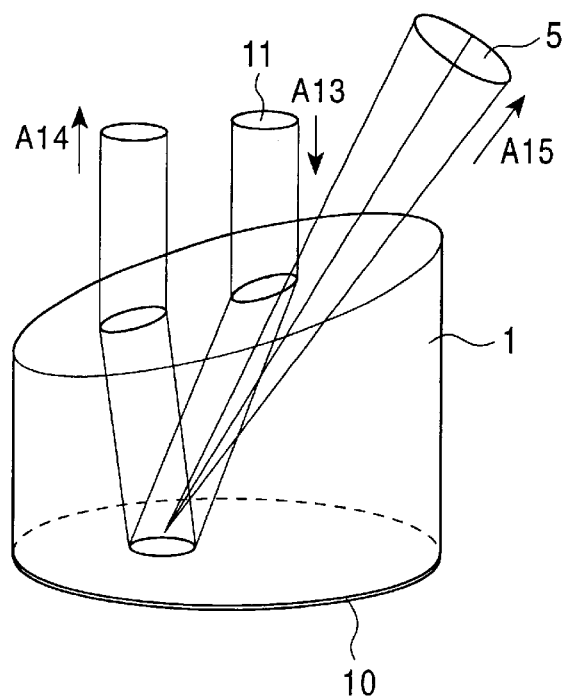
FIG. 14 is a schematic perspective view showing optical paths when a reconstruction light is incident upon the hologram recording medium having the reflection surface according to the present invention and the object light is reconstructed.

First, a hologram recording medium 1 using a plane mirror, as a reflective layer, will be described below. As shown in FIGS. 13 and 14, a plane mirror 10 is disposed at the underside of the hologram recording medium 1 and reflects the reference light 4.

When recording a hologram in the hologram recording medium 1 having the plane mirror 10, a reference light 4 is irradiated in the direction of arrow A10 in FIG. 13. The reference light 4 enters the hologram recording medium 1 and is deflected at an incident surface thereof. Then, the reference light 4 is reflected by the plane mirror 10 in the direction of arrow A11.

Also, when recording a hologram in the hologram recording medium 1 having the plane mirror 10, an object light 5 is irradiated in the direction of arrow A12.

The hologram recording medium 1 records, as a hologram, an interference pattern of the reference light 4 and the object light 5 which have entered the hologram recording medium 1 through the respective optical paths described above.

When reconstructing the recorded hologram, a reconstruction light 11 is irradiated in the direction of arrow A13 in FIG. 14. After entering the hologram recording medium 1, the reconstruction light 11 is deflected at the incident surface thereof and then reflected by the plane mirror 10 in the direction of arrow A14. The object light 5 is reconstructed from the hologram recording medium 1 upon irradiation of the reconstruction light 11, and propagates in the direction of arrow A15.

Figure 15:
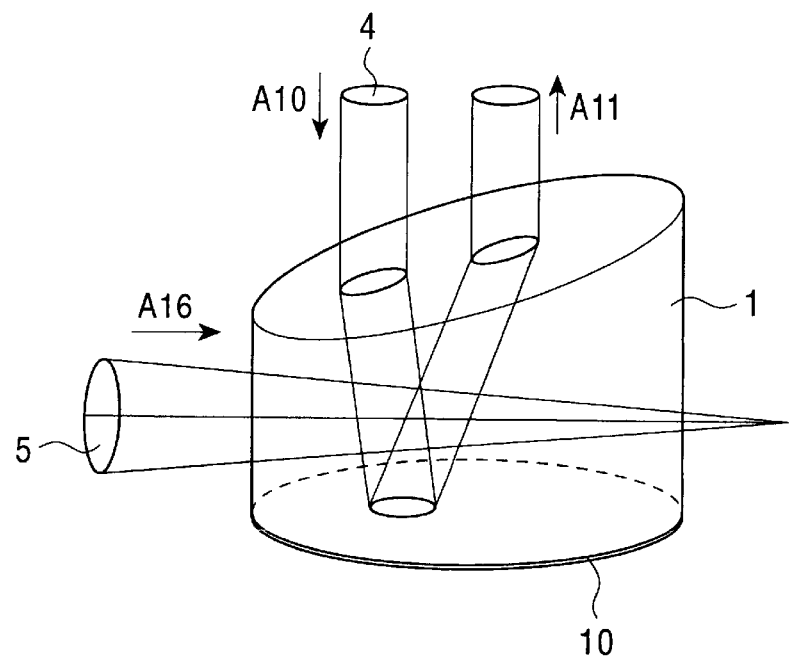
FIG. 15 is a schematic perspective view showing optical paths when the reference light and the object light are incident upon the hologram recording medium having the reflection surface according to the present invention.
Figure 16:
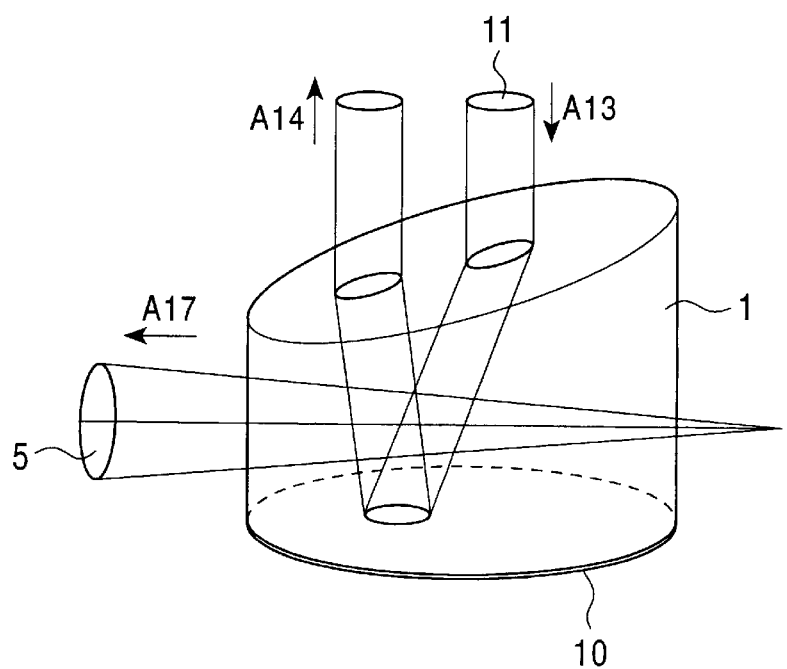
FIG. 16 is a schematic perspective view showing optical paths when the reconstruction light is incident upon the hologram recording medium having the reflection surface according to the present invention and the object light is reconstructed.

Alternatively, as indicated by arrow A16 in FIG. 15, the object light 5 may be irradiated to the hologram recording medium 1 in the direction toward a circumferential surface thereof. In this case, when the reconstruction light 11 is irradiated to reconstruct a recorded hologram, the object light 5 is reconstructed in the direction of arrow A17 in FIG. 16. The reference light 4 is irradiated, refracted and reflected similarly to the above case of irradiating the object light 5 in the direction of arrow A12, and hence a detailed description is not repeated herein. Additionally, when the object light 5 is irradiated to the hologram recording medium 1, which has the hologram recording layer 2 as with the first embodiment, in the direction toward its circumferential surface as indicated by arrow A16, an area where the reference light 4 and the object light 5 interfere with each other must be formed in the hologram recording layer 2.

With the hologram recording medium 1 having the plane mirror 10 as the reflective layer, as described above, the object light 5 is reconstructed in an exactly reversed relation to the direction, in which the object light 5 has been irradiated, by irradiating the reconstruction light 11, which is, e.g., the same as the reference light 4, so as to propagate backward along the optical path of the reference light 4 irradiated for recording a hologram.

Next, a hologram recording medium employing a corner cube group as a reflective layer will be described below. In this case, as shown in FIGS. 17 and 18, a corner cube group 12 is disposed on a first primary surface of a hologram recording medium 1 parallel to the plane, in which the hologram recording medium 1 is rotated, for recording and reconstructing holograms.

Figure 19:
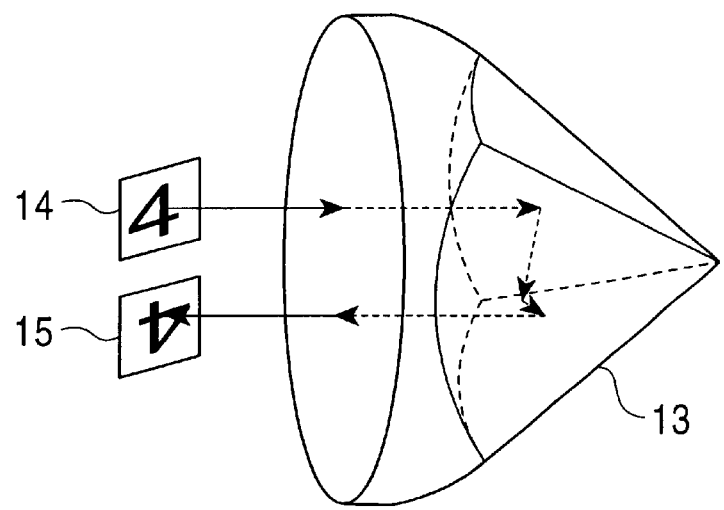
FIG. 19 is a schematic view showing how a laser beam incident upon a corner cube used in the present invention is reflected.

The corner cube group 12 is constituted by arranging corner cubes 13, shown in FIG. 19, into an array. The corner cube 13 is, e.g., a prism or a mirror having three reflection surfaces arranged perpendicularly to each other, and has such a shape as obtained by cutting an apex portion of a cube so as to provide those three reflection surfaces. In the corner cube 13, a laser beam enters one surface, is totally reflected by the three reflection surfaces, and then emits from the incident surface in a direction reversed to the incident direction of the laser beam. A that time, the emergent laser beam is deflected 180 degrees relative to the incident laser beam. Images 14, 15 shown in FIG. 19 represent that an incident image is deflected 180 degrees, i.e., that the incident image 14 is totally reflected three times in the corner cube 13 and then exit as the emergent image 15 after being deflected 180 degrees. Additionally, the corner cube 13 constituted by a mirror having a hollow inner space is particularly effective in the case of performing wavelength multiplex recording because such a corner cube is free from wavelength dependency.

Figure 20:
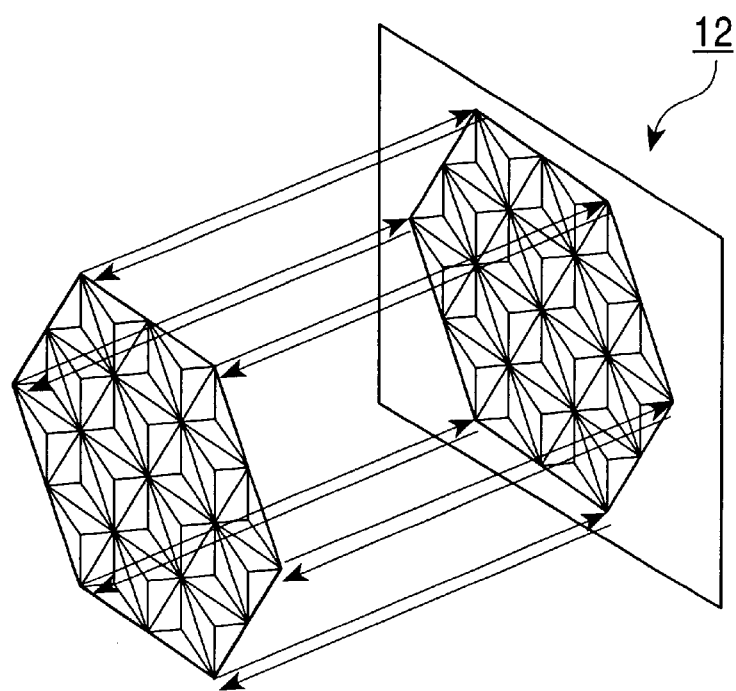
FIG. 20 is a schematic view showing the corner cube group used in the present invention.
Figure 21:
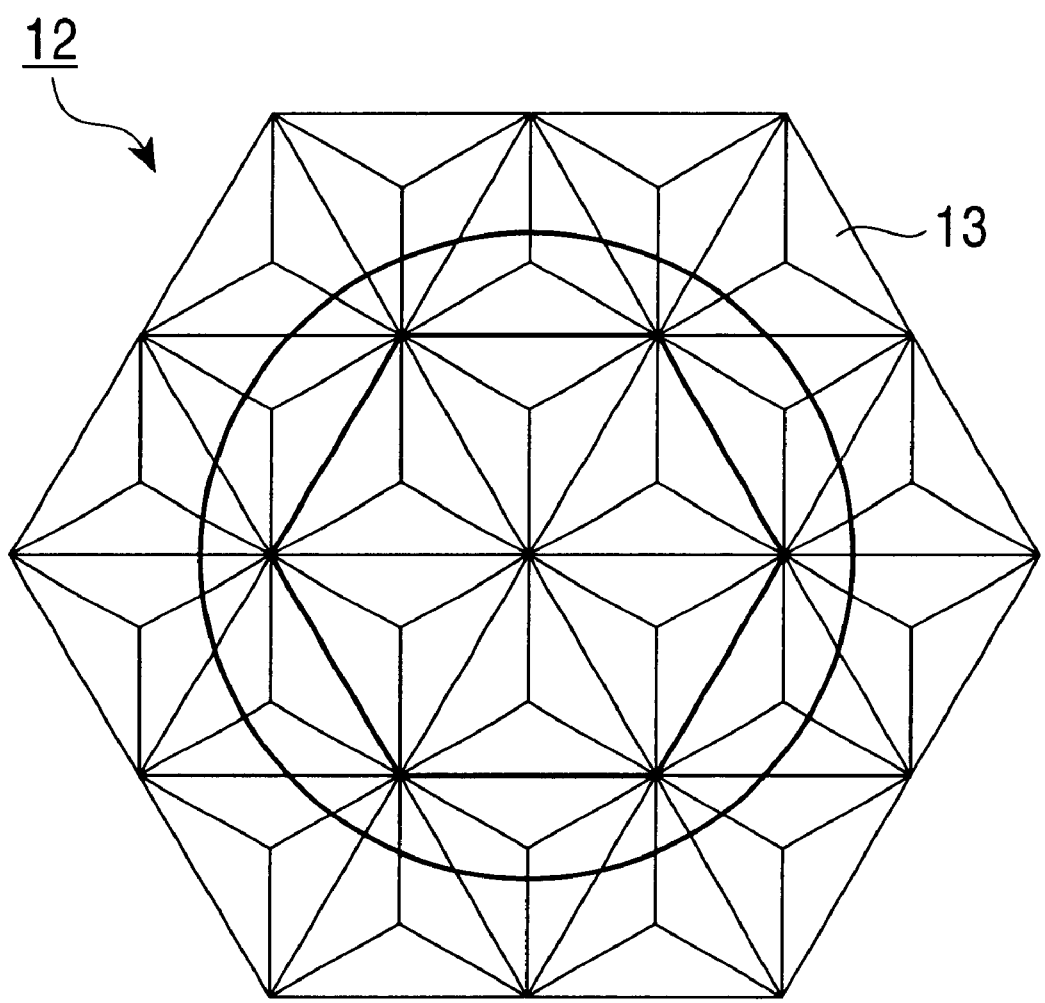
FIG. 21 is a schematic view showing how a laser beam incident upon a corner cube used in the present invention is reflected.

The corner cube group 12 in the form of an array of the above-described corner cubes 13 is constituted by arranging the corner cubes 13 in close contact with each other as shown in FIGS. 20 and 21.

Figure 17:
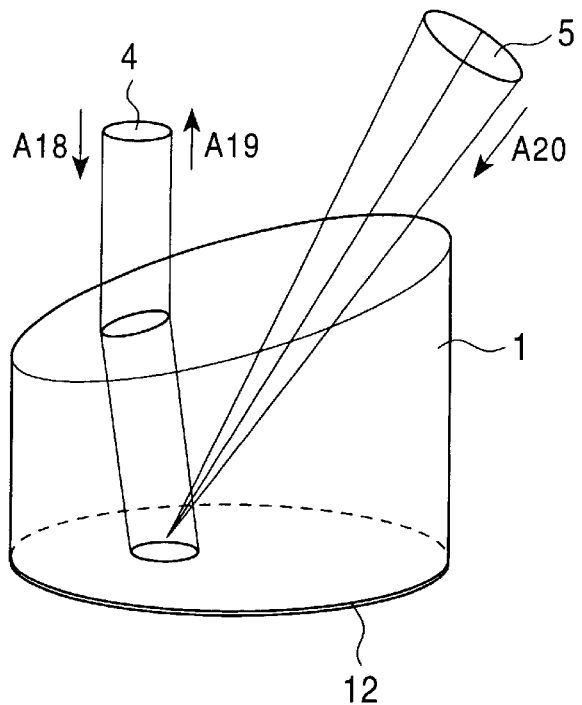
FIG. 17 is a schematic perspective view showing optical paths when the reference light and the object light are incident upon a hologram recording medium having a corner cube group according to the present invention.
Figure 18:
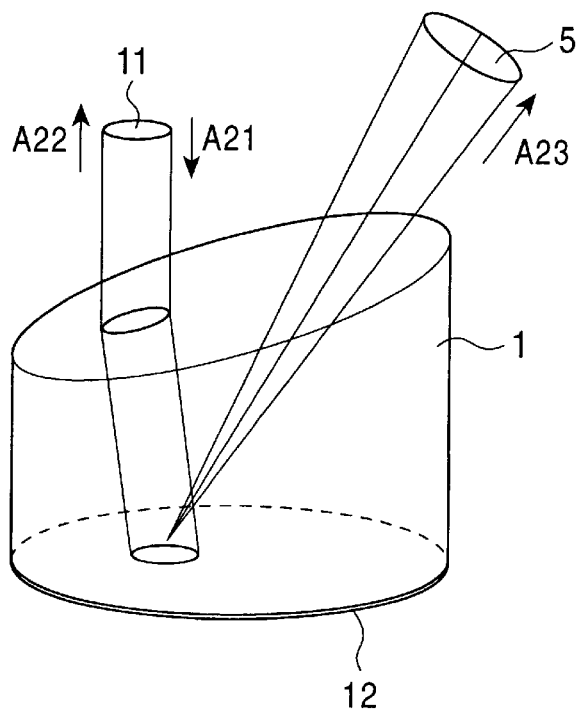
FIG. 18 is a schematic perspective view showing optical paths when the reconstruction light is incident upon the hologram recording medium having the corner cube group according to the present invention and the object light is reconstructed.

When recording a hologram in the hologram recording medium 1 having the corner cube group 12, a reference light 4 is irradiated in the direction of arrow A18 in FIG. 17. The reference light 4 enters the hologram recording medium 1 and is deflected at an incident surface thereof. Then, the reference light 4 is reflected by the corner cube group 12 in the direction of arrow A19.

Also, when recording a hologram in the hologram recording medium 1 having the corner cube group 12, an object light 5 is irradiated in the direction of arrow A20.

The hologram recording medium 1 records, as a hologram, an interference pattern of the reference light 4 and the object light 5 which have entered the hologram recording medium 1 through the respective optical paths described above.

When reconstructing the recorded hologram, a reconstruction light 11 is irradiated in the direction of arrow A21 in FIG. 18. After entering the hologram recording medium 1, the reconstruction light 11 is deflected at the incident surface thereof and then reflected by the corner cube group 12 in the direction of arrow A22. The object light 5 is reconstructed from the hologram recording medium 1 upon irradiation of the reconstruction light 11, and propagates in the direction of arrow A23.

Figure 22:
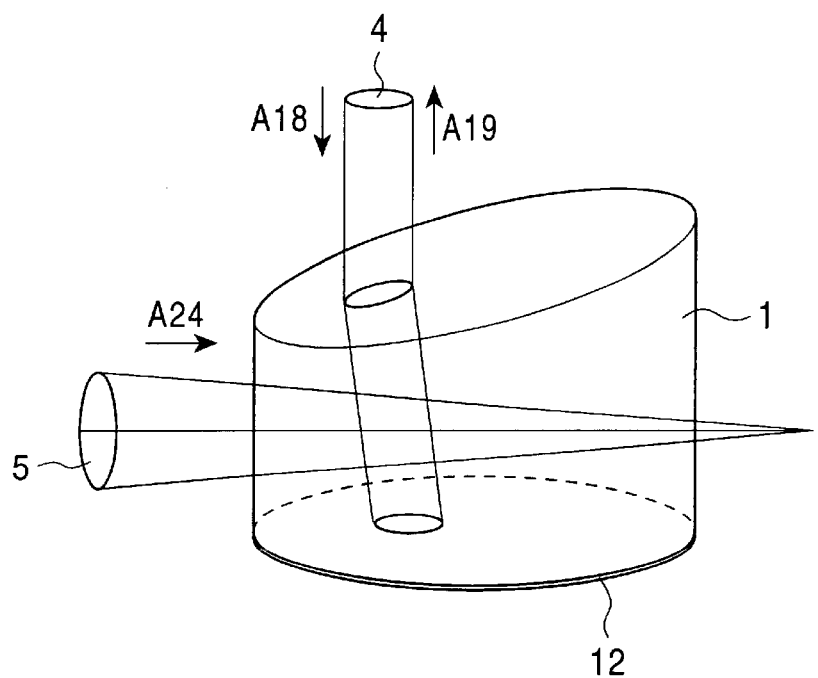
FIG. 22 is a schematic perspective view showing optical paths when the reference light and the object light are incident upon a hologram recording medium having a corner cube group according to the present invention.
Figure 23:
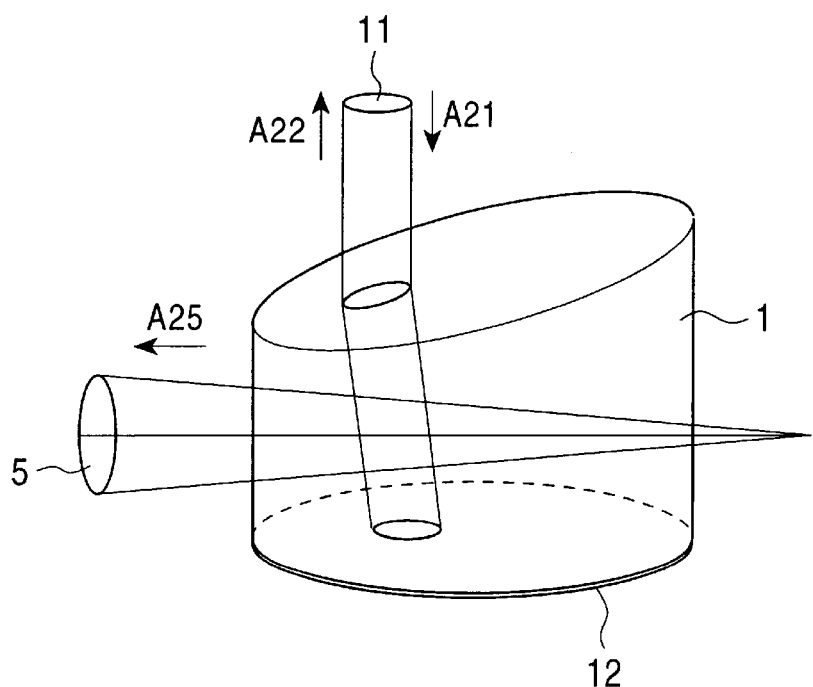
FIG. 23 is a schematic perspective view showing optical paths when the reconstruction light is incident upon the hologram recording medium having the corner cube group according to the present invention and the object light is reconstructed.

Alternatively, as indicated by arrow A24 in FIG. 22, the object light 5 may be irradiated to the hologram recording medium 1 in the direction toward a circumferential surface thereof. In this case, the object light 5 is reconstructed in the direction of arrow A25 in FIG. 23. The reference light 4 is irradiated, refracted and reflected similarly to the above case of irradiating the object light 5 in the direction of arrow A20, and hence a detailed description is not repeated herein. Additionally, when the object light 5 is irradiated to the hologram recording medium 1, which has the hologram recording layer 2 as with the first embodiment, in the direction toward its circumferential surface as indicated by arrow A24, an area where the reference light 4 and the object light 5 interfere with each other must be formed in the hologram recording layer 2.

With the hologram recording medium 1 having the corner cube group 12 as the reflective layer, as described above, the object light 5 is reconstructed in a reversed relation to the direction, in which the object light 5 has been irradiated, by irradiating the reconstruction light 11, which is, e.g., phase conjugate to the reference light 4, through the same optical path as that of the reference light 4 irradiated for recording a hologram.

Thus, the hologram recording medium 1 having the reflective layer is able to record an interference pattern of the reference light 4 and the object light 5 irradiated to it, and when irradiated by the reconstruction light 11, the hologram recording medium 1 is able to reconstruct the recorded object light 5 and reproduce the recorded information signal as a hologram.

At that time, the phase conjugate reconstruction of holograms can be performed by employing, as the reconstruction light 11 (i.e., the phase conjugate light), the reference light 4 reflected by the reflective layer disposed on the hologram recording medium 1.

As a result, the hologram recording/reconstructing apparatus does not require an optical system for creating the phase conjugate light any more. Also, since the reconstructed object light 5 is always positioned in alignment with the direction in which the object light 5 is irradiated, an increase in size of the apparatus structure can be avoided.

Further, with the hologram recording medium 1 employing the corner cube group 12, since the reference light 4 and the reconstruction light 11 propagate through the exactly same optical paths, the phase conjugate reconstruction of holograms can be performed by employing the reference light 4, as it is, without any additional adjustment of the optical system for irradiating the reconstruction light 11. Hence, a simplification in structure of the hologram recording/reconstructing apparatus is also expected.

While, in the above description, the reflective layer is disposed on the first primary surface of the hologram recording medium 1 and a reflected light of the reference light 4 is utilized as the reconstruction light 11, the reference light 4 may be irradiated as the reconstruction light 11 from the side of the hologram recording medium 1 opposite to the first primary surface. In such a case, the structure of the hologram recording/reconstructing apparatus is somewhat complicated, but the phase conjugate reconstruction of holograms can be performed with an optical path separate from that of the reference light 4 for recording the holograms.

Moreover, in the phase conjugate reconstruction of holograms, since the wavefront of the reference light 4 in the recording mode is perfectly restored, aberrations are completely compensated. Accordingly, even when the object light 5 is irradiated in the direction toward the circumferential surface of the hologram recording medium 1 as shown in FIGS. 15, 16, 22 and 23, a satisfactory reconstruction output can be obtained. Also, since the original wavefront is perfectly restored in the phase conjugate reconstruction of holograms, the circumferential surface of the hologram recording medium 1 may have any desired shape.

From the principle point of view, the circumferential surface of the hologram recording medium 1 may be a rough surface. Taking into account a reduction in utilization efficiency of light due to scattering, however, the circumferential surface is preferably formed with a high surface precision for suppressing a scattered light and improving the utilization efficiency of light. Note that the shape of the circumferential surface is not limited to a particular one, and it may be a discontinuous surface.

Figure 24:
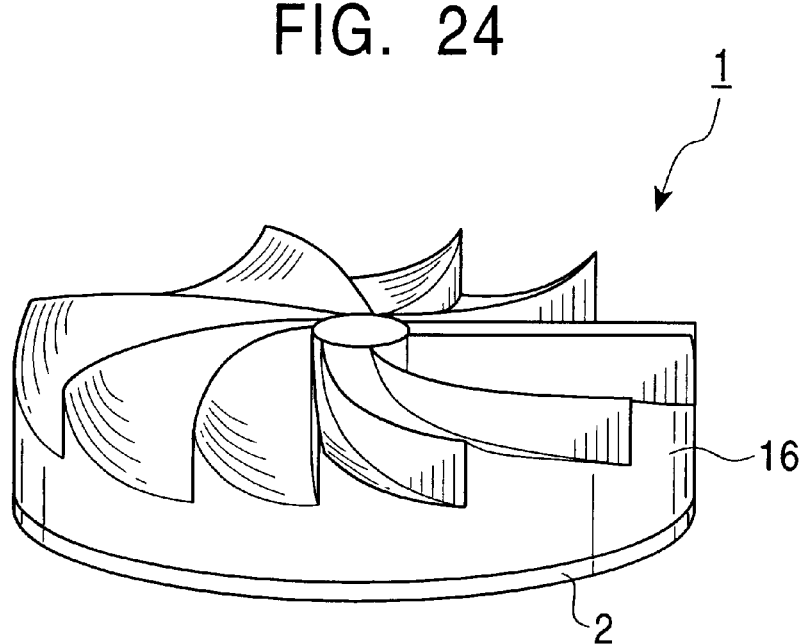
FIG. 24 is a schematic perspective view showing a modification of the hologram recording medium according to the present invention.

In the hologram recording medium 1 according to the present invention, by setting the inclination angle of the wedge substrate 3 to a greater value, the deflection direction of the laser beam is varied at a larger angle, the degree of multiplexity in the angle multiplex recording of holograms is increased, and the extent of selection in reconstructing the holograms is increased, thus resulting in a higher recording density. However, simply increasing the inclination angle of the wedge substrate 3 leads to a larger thickness of the hologram recording medium 1 and increases its volume. To avoid such a drawback, as shown in FIG. 24, the hologram recording medium 1 may be divided into plural areas so as to provide a modified wedge substrate 16 wherein each of the divided areas has a surface inclined relative to the plane in which the hologram recording medium 1 is rotated.

With such a modification, since the inclination angle of the wedge substrate 3 can be increased in each division area, it is possible to enlarge the deflection angle of the reference light 4 and to increase the degree of multiplexing in the angle multiplex recording of holograms. As a result, an improvement in the recording density is expected. As another advantage, unbalanced weight can be prevented from occurring with respect to the plane in which the hologram recording medium 1 is rotated, and stability during the rotation of the hologram recording medium 1 can be improved. While FIG. 24 shows the case in which the hologram recording medium 1 has the hologram recording layer 2 as with the first embodiment, the modification is also similarly applied to the hologram recording medium 1 not having the hologram recording layer 2 as with the second embodiment. Further, the hologram recording medium having the reflective layer can also be modified in a like manner.

The opening 1a formed at the center of the hologram recording medium 1 may be omitted. A hologram recording medium having such an arrangement is advantageous in that a storage area can be extended to a central portion of the medium and hence the storage capacity can be increased.

Next, the hologram recording/reconstructing apparatus and method according to the present invention will be described in connection with the case of recording and/or reconstructing holograms in and from the hologram recording medium 1 described above. Note that the description made above in connection with the hologram recording medium 1 is not repeated in the following description.

Figure 25:
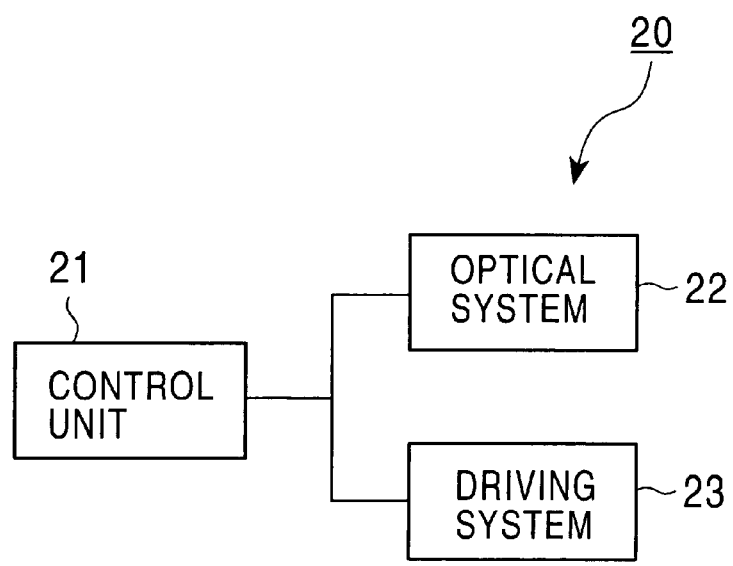
FIG. 25 is a block diagram showing a configuration of a hologram recording/reconstructing apparatus according to the present invention.

FIG. 25 shows one example of a configuration of a hologram recording/reconstructing apparatus 20 of the present invention. The hologram recording/reconstructing apparatus 20 comprises a control unit 21, an optical system 22, and a driving system 23.

The control unit 21 executes overall control of the hologram recording/reconstructing apparatus 20.

Figure 26:
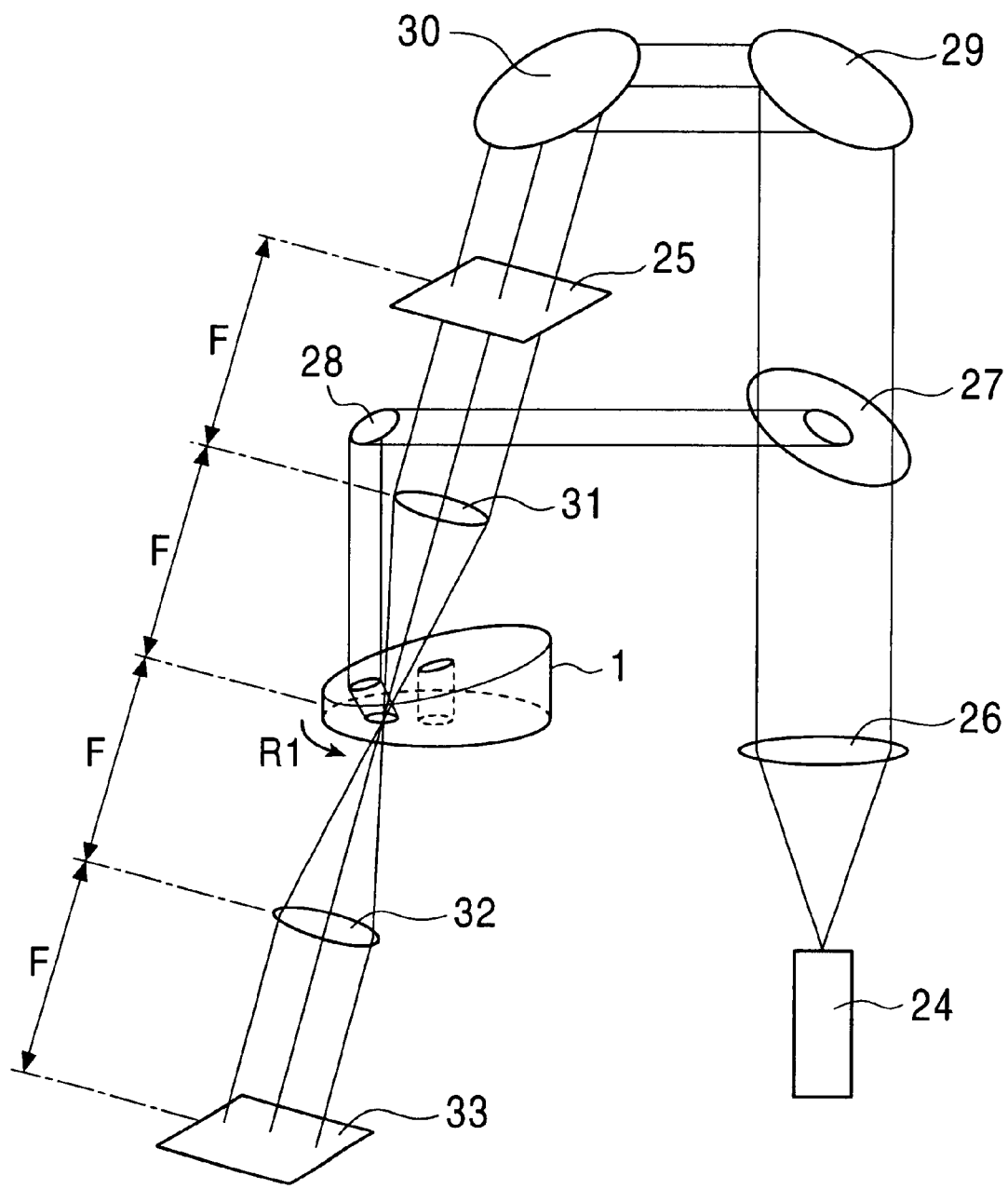
FIG. 26 is a schematic view showing one example of an arrangement of the hologram recording/reconstructing apparatus according to the present invention.

The optical system 22 comprises, as shown in FIG. 26, a laser beam source 24, a spatial modulator 25, a collimator lens 26, a beam splitter 27, mirrors 28, 29, 30, Fourier transform lenses 31, 32, and a detector array 33.

The laser beam source 24 is preferably a solid laser, a gas laser, a semiconductor laser, or a source capable of continuously outputting a coherent light obtained from any of those laser beams through nonlinear wavelength conversion. Particularly preferable ones of the laser beam source 24 are a Nd:YAG laser, a second higher harmonic wave of a Nd:YV04 laser, and an Ar ion laser, because they have advantages, when employed to record holograms in the hologram recording medium 1 according to the present invention, in that their laser beams have a high sensitivity for the hologram recording medium 1, have superior coherency, and are easily available.

Also, the laser beam source 24 may be a semiconductor laser, e.g., GaN. Such a semiconductor laser may be combined with a DFB (Distributed Feed-Back) structure, an external resonator, etc. for narrowing a wavelength width. The laser beam outputted from the laser beam source 24 is used as the reference light 4, the object light 5 and the reconstruction light 11.

The spatial modulator 25 has the function of giving an information signal in the form of optical phase information to the irradiated laser beam, and creating the object light 5 when a hologram is recorded in the hologram recording medium 1.

The spatial modulator 25 may be of the transmission type, for example, a transmission liquid crystal spatial modulator provided as a commercially available liquid crystal panel. However, the spatial modulator 25 is not limited to the transmission liquid crystal spatial modulator, but may be, e.g., a reflecting spatial modulator utilizing the micromachining technique.

The collimator lens 26 has the function of converting the laser beam outputted from the laser beam source 24 into a parallel beam, and transmitting the parallel beam to the beam splitter 27.

The beam splitter 27 has the function of dividing the laser beam, which has been converted to the parallel beam by the collimator lens 26, into two parts, one of which is reflected by the mirror 28 to serves as the reference light 4 and the other of which passes the beam splitter 27 and is transmitted to the mirror 29.

The mirror 28 irradiates one part of the laser beam divided by the beam splitter 27, as the reference light 4, to the hologram recording medium 1.

The mirror 29 irradiates the other part of the laser beam divided by the beam splitter 27 to the mirror 30.

The mirror 30 reflects the laser beam reflected by the mirror 29 to the spatial modulator 25.

The Fourier transform lens 31 performs the Fourier transform of the laser beam having passed through the spatial modulator 25, and irradiates the transformed beam to the hologram recording medium 1.

The Fourier transform lens 32 performs the Fourier transform of the object light 5 reconstructed from the hologram recording medium 1, and irradiates the transformed beam to the detector array 33.

The detector array 33 is constituted by, e.g., a CCD (Charge-Coupled Device), and detects the reconstructed object light 5 as an electrical signal. While a CCD is most easily available at the present, the detector array 33 is not limited to the CCD, but may be constituted by, e.g., a CMOS (Complementary Metal-oxide Semiconductor Device) that has been recently developed because of low power consumption and low cost.

The driving system 23 has a spindle motor (not shown) for rotating the hologram recording medium 1. The driving system 23 is not limited to a spindle motor, but may be a stepping motor or the like.

The hologram recording/reconstructing apparatus 20 having the above-described arrangement, according to the present invention, operates and records holograms in the hologram recording medium 1 as follows.

First, the laser beam source 24 emits the laser beam to the collimator lens 26 while the output of the laser beam is adjusted by the control unit 21. The collimator lens 26 converts the emitted laser beam into a parallel beam, and irradiates the parallel beam to the beam splitter 27.

Then, the beam splitter 27 reflects a part of the irradiated laser beam to the mirror 28, and allows the other part of the irradiated laser beam to pass through it toward the mirror 29.

The mirror 28 further reflects the laser beam reflected by the beam splitter 27 and irradiates it, as the reference light 4, to the hologram recording medium 1.

On the other hand, the mirror 29 reflects the laser beam, which has passed through the beam splitter 27, toward the mirror 30. The mirror 30 then reflects the laser beam reflected by the mirror 29 toward the spatial modulator 25.

The spatial modulator 25 displays a recording pattern corresponding to an information signal to be recorded under control of the control unit 21, and gives the information signal in the form of optical phase information to the laser beam reflected by the mirror 30, thereby creating the object light 5 that is transmitted to the Fourier transform lens 31.

The Fourier transform lens 31 performs the Fourier transform of the object light 5, which is provided as the optical phase information from the spatial modulator 25 based on the information signal. The transformed object light is irradiated to the hologram recording medium 1.

Through the operation described above, the hologram recording/reconstructing apparatus 20 records, as a hologram, an interference pattern of the reference light 4 and the object light 5 in the hologram recording medium 1. After the completion of recording of one hologram, the driving system 23 is controlled in response to a driving signal from the control unit 21 so that the hologram recording medium 1 is rotated, e.g., in the direction of arrow R1. Then, a next hologram is recorded in a similar manner.

The operation of the hologram recording/reconstructing apparatus 20 for reconstructing holograms from the hologram recording medium 1, on which the holograms are recorded, will now be described.

In the reconstruction mode, the hologram recording medium 1 is placed at the same position as that in the recording mode, and the reference light 4 is employed as the reconstruction light 11.

First, the laser beam source 24 emits the laser beam to the collimator lens 26 while the output of the laser beam is adjusted by the control unit 21. The collimator lens 26 converts the emitted laser beam into a parallel beam, and irradiates the parallel beam to the beam splitter 27.

Then, the beam splitter 27 reflects a part of the laser beam irradiated through the collimator lens 26 to the mirror 28, and allows the other part of the irradiated laser beam to passes through it toward the mirror 29.

The mirror 28 further reflects the laser beam reflected by the beam splitter 27 and irradiates it, as the reconstruction light 11, to the hologram recording medium 1.

On the other hand, a shutter (not shown) blocks off the optical path of the laser beam having passed. through the beam splitter 27.

Thus, only the reference light 4, which has been used in the recording mode, is irradiated as the reconstruction light 11 to the hologram recording medium 1, whereupon the recorded object light 5 is reconstructed toward the Fourier transform lens 32.

The Fourier transform lens 32 performs the Fourier transform of the object light 5, which has been reconstructed from the hologram recording medium 1, and focuses a pattern corresponding to the information signal on the detector array 33. Then, the detector array 33 can provide, as a reproduced information signal, the focused pattern corresponding to the information signal. After the completion of reconstruction of one hologram, the driving system 23 is controlled in response to a driving signal from the control unit 21 so that the hologram recording medium 1 is rotated, e.g., in the direction of arrow R1. Then, a next hologram is reconstructed in a similar manner.

By repeating the operation described above, the hologram recording/reconstructing apparatus 20 reconstructs the recorded holograms successively.

In the hologram recording/reconstructing apparatus 20, the optical paths of the reference light 4 and the object light 5 passing through the hologram recording medium 1 are varied with the rotation of the hologram recording medium 1. In sync with the rotation of the hologram recording medium 1, therefore, the position of the detector array 33 is adjusted under control of the control unit 21. For example, an actuator (not shown) is employed to adjust the position of the detector array 33.

The above description has been made, by way of example, in connection with a transmission Fourier hologram. When recording a Fourier hologram, an optical system called a "4F system" is constructed in which the spatial modulator 25, the Fourier transform lenses 31, 32, the hologram recording medium 1, and the detector array 33 are arranged such that the distance between the spatial modulator 25 and the Fourier transform lens 31, the distance between the Fourier transform lens 31 and the hologram recording medium 1, the distance between the hologram recording medium 1 and the Fourier transform lens 32, and the distance between the Fourier transform lens 32 and the detector array 33 are each equal to the focal length F of the Fourier transform lenses 31, 32. In that optical system, however, the hologram recording medium 1 is preferably positioned slightly offset from the exact Fourier plane. The reason resides in ensuring a sufficient area for recording of a hologram by increasing an area of the hologram recording medium 1, in which the object light 5 is irradiated.

As a matter of course, conventional various methods can also be combined with the hologram recording/reconstructing apparatus and method according to the present invention. For example, the hologram recording/reconstructing apparatus 20 may include a reflecting member to provide a reflection hologram.

The hologram recording/reconstructing apparatus 20 including a reflecting member to provide a reflection hologram will be described below.

Figure 27:
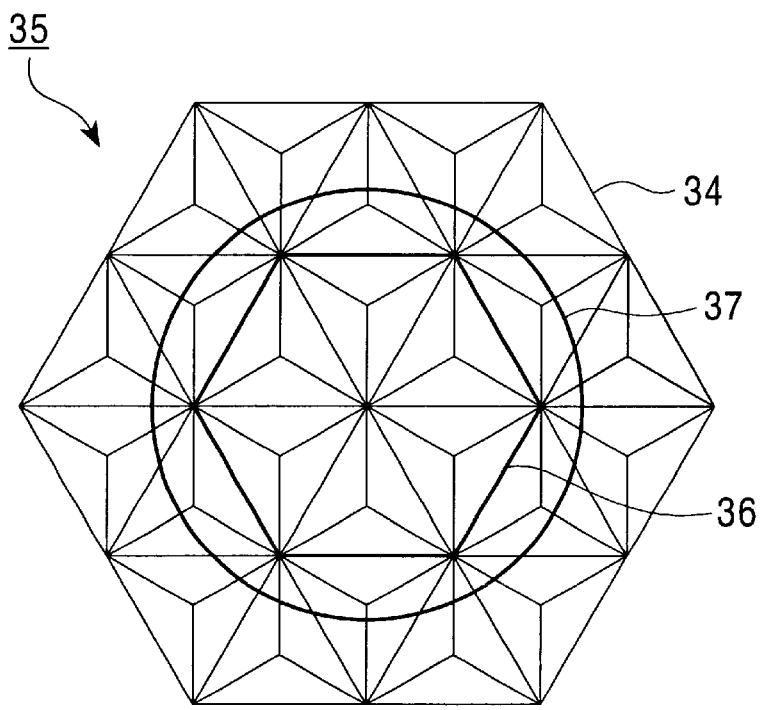
FIG. 27 is a schematic view of a corner cube group used in the hologram recording/reconstructing apparatus according to the present invention.

A description is first made of the case employing, as the reflecting member, a corner cube 34 or a corner cube group 35 made up of corner cubes 34 arranged into an array, as shown in FIG. 27. The corner cube 34 or the corner cube group 35 has the function of reflecting a laser beam irradiated to it in an exactly reversed relation to the direction in which the laser beam has been irradiated.

When performing the phase conjugate reconstruction of holograms using the corner cube 34, the reference light 4 in the form of a plane wave having passed through the hologram recording medium 1 is irradiated to and reflected by the corner cube 34 so as to provide a phase conjugate light. However, the position of the reference light 4 is shifted between optical paths going to and coming back from the corner cube 34. To avoid such a shift, the reference light 4 is irradiated such that it always enters substantially the center of the corner cube 34.

When performing the phase conjugate reconstruction of holograms using the corner cube group 35, a laser beam 36 entering six corner cubes 34 located in a central area provides a reflected beam having the same wavefront as that of the incident beam but propagating in the reversed direction. This is because even if the optical path of the laser beam entering each of those corner cubes 34 is shifted upon the reflection, there is another laser beam entering the corner cube through the same optical path from the opposite side. While a part of a laser beam entering the corner cubes 34 in a peripheral area cannot contribute to the phase conjugate reconstruction because of a shift of the optical path occurred upon the reflection, a sufficient amount of the reflected light is obtained as a whole. Therefore, a sufficient amount of the phase conjugate light can be obtained. Additionally, since the hologram recording method can record holograms that are spatially distributed in the recording area of the hologram recording medium 1 with a high redundancy, the holograms can be satisfactorily reconstructed using the phase conjugate light generated as described above.

From the practical point of view, there is a problem with the accuracy of reflection angle of the corner cube 34. When multiplex recording of holograms is performed by machining a crystal of lithium niobate doped with iron, which is a typical recording material, into a cubic shape and then irradiating the object light 5 and the reference light 4 through adjacent surfaces of the cubic crystal in a perpendicular relation, the holograms are multiplex-recorded at angular intervals of about five-thousandths of one degree. The accuracy of reflection angle of the corner cube group 35 manufactured by Edmond Scientific Co., for example, is about sixty-thousandths of one degree. In such a case, by reducing a beam diameter by using a beam expander in a reversed manner while a beam is kept in the parallel form, and then irradiating the narrowed beam to the corner cube group 35, the reflection angle accuracy can be improved corresponding to a magnification of the beam. For example, if the beam diameter of a light incident upon the corner cube group 35 is reduced to ¹⁄₁₂, a reflection angle error of five-thousandths of one degree is obtained for the beam that has returned to the hologram recording medium 1 upon reflection at the corner cube group 35 after passing through the beam expander double (not shown).

By employing that type of corner cube group 35, the phase conjugate reconstruction can be easily performed even in the case of recording and/or reconstructing holograms while the hologram recording medium 1 is rotated.

The hologram recording/reconstructing apparatus 20 having the corner cube group 35 as the reflecting member will now be described in more detail with reference to FIGS. 28 to 30, which show principal parts of the apparatus 20.

Figure 28:
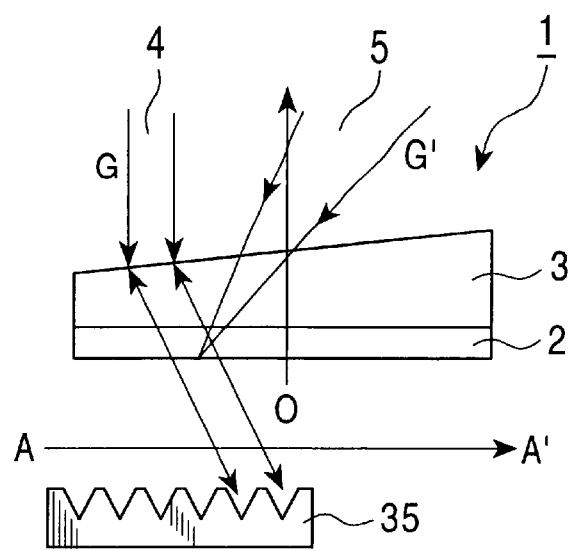
FIG. 28 is a schematic vertical sectional view showing optical paths when the hologram recording/reconstructing apparatus having the corner cube group according to the present invention irradiates the reference light and the object light to the hologram recording medium having the hologram recording layer.

First, FIG. 28 shows a section, taken along line A–A' in FIG. 2, of the hologram recording medium 1 combined with the corner cube group 35. The reference light 4 irradiated toward the hologram recording medium 1 enters the wedge substrate 3 through an optical path indicated by arrow G. The reference light 4 having entered the wedge substrate 3 is deflected in its propagating direction at an incident surface of the wedge substrate 3, and then reaches the hologram recording layer 2.

In the state of FIG. 28, the object light 5 irradiated toward the hologram recording medium 1 enters the wedge substrate 3 through an optical path indicated by arrow G', and then reaches the hologram recording layer 2.

A hologram is recorded as an interference pattern of the reference light 4 and the object light 5 that are incident upon the hologram recording medium 1 through the optical paths described above.

When reconstructing the recorded hologram, the reference light 4 is employed, as it is, as the reconstruction light 11. More specifically, the reference light 4 enters the wedge substrate 3 through the optical path indicated by arrow G. The reference light 4 having entered the wedge substrate 3 is deflected in its propagating direction at the incident surface of the wedge substrate 3, and then reaches the hologram recording layer 2 and passes through it. After being reflected by the corner cube group 35, the reference light 4 propagates back along the optical path indicated by arrow G and then reaches the hologram recording layer 2 again.

Thus, the phase conjugate reconstruction of holograms is performed by employing the reference light 4 as the phase conjugate light.

Figure 29:
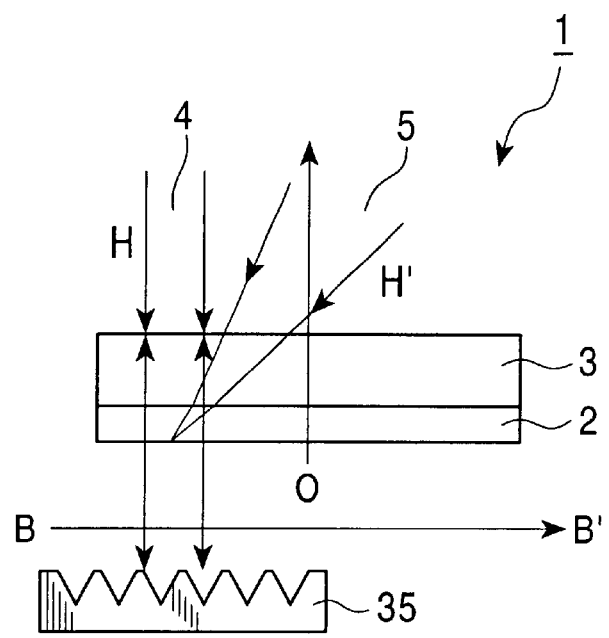
FIG. 29 is a schematic vertical sectional view showing optical paths when the hologram recording/reconstructing apparatus having the corner cube group according to the present invention irradiates the reference light and the object light to the hologram recording medium having the hologram recording layer.

Next, FIG. 29 shows a section, taken along line B–B' in FIG. 2, of the hologram recording medium 1 combined with the corner cube group 35; namely, a section resulted by rotating the hologram recording medium 1 through 90 degrees from the state of FIG. 28 in the direction of arrow R1. The reference light 4 irradiated toward the hologram recording medium 1 enters the wedge substrate 3 through an optical path indicated by arrow H. The reference light 4 having entered the wedge substrate 3 is deflected at the incident surface of the wedge substrate 3, and then reaches the hologram recording layer 2.

In the state of FIG. 29, the object light 5 irradiated toward the hologram recording medium 1 enters the wedge substrate 3 through an optical path indicated by arrow H', and then reaches the hologram recording layer 2.

A hologram is recorded as an interference pattern of the reference light 4 and the object light 5 that are incident upon the hologram recording medium 1 through the optical paths described above.

When reconstructing the recorded hologram, the reference light 4 is employed, as it is, as the reconstruction light 11. More specifically, the reference light 4 enters the wedge substrate 3 through the optical path indicated by arrow H. The reference light 4 having entered the wedge substrate 3 is deflected in its propagating direction at the incident surface of the wedge substrate 3, and then reaches the hologram recording layer 2 and passes through it. After being reflected by the corner cube group 35, the reference light 4 propagates back along the optical path indicated by arrow H and then reaches the hologram recording layer 2 again.

Thus, the phase conjugate reconstruction of holograms is performed by employing the reference light 4 as the phase conjugate light.

Figure 30:
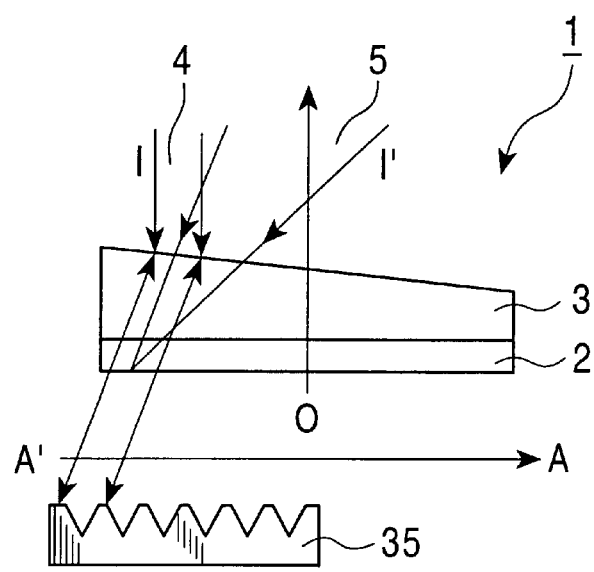
FIG. 30 is a schematic vertical sectional view showing optical paths when the hologram recording/reconstructing apparatus having the corner cube group according to the present invention irradiates the reference light and the object light to the hologram recording medium having the hologram recording layer.

Next, FIG. 30 shows a section of the hologram recording medium 1, which is combined with the corner cube group 35, taken along line A'–A in FIG. 2 and being reversal to the section of FIG. 28; namely, a section resulted by rotating the hologram recording medium 1 through 180 degrees from the state of FIG. 28 in the direction of arrow R1. The reference light 4 irradiated toward the hologram recording medium 1 enters the wedge substrate 3 through an optical path indicated by arrow I. The reference light 4 having entered the wedge substrate 3 is deflected at the incident surface of the wedge substrate 3, and then reaches the hologram recording layer 2.

In the state of FIG. 30, the object light 5 irradiated toward the hologram recording medium 1 enters the wedge substrate 3 through an optical path indicated by arrow I', and then reaches the hologram recording layer 2.

A hologram is recorded as an interference pattern of the reference light 4 and the object light 5 that are incident upon the hologram recording medium 1 through the optical paths described above.

When reconstructing the recorded hologram, the reference light 4 is employed, as it is, as the reconstruction light 11. More specifically, the reference light 4 enters the wedge substrate 3 through the optical path indicated by arrow I. The reference light 4 having entered the wedge substrate 3 is deflected in its propagating direction at the incident surface of the wedge substrate 3, and then reaches the hologram recording layer 2 and passes through it. After being reflected by the corner cube group 35, the reference light 4 propagates back along the optical path indicated by arrow I and then reaches the hologram recording layer 2 again.

Thus, the phase conjugate reconstruction of holograms is performed by employing the reference light 4 as the phase conjugate light.

Next, in a section taken along line B'–B in FIG. 2 that is a reversal to the section of FIG. 29, i.e., in a section resulted by rotating the hologram recording medium 1 through 270 degrees from the state of FIG. 28 in the direction of arrow R1, the reference light 4 and the object light 5 behave substantially in the same manner as those in the state of FIG. 29, and hence a description is not repeated here.

With the hologram recording/reconstructing apparatus 20 having the corner cube group 35, as described above, by rotating the hologram recording medium 1, the propagating direction of each of the reference light 4 and the object light 5 irradiated to the hologram recording medium 1 can be varied at the incident surface of the wedge substrate 3. After recording an information signal as one hologram and then rotating the hologram recording medium 1 through an angle to such an extent that the Bragg condition for the previously recorded hologram is no longer satisfied, a subsequent information signal is recorded in the form of optical phase information, i.e., another hologram. In the reconstruction mode, by irradiating, as the reconstruction light 11, the reference light 4 to the hologram recording medium 1, the object light 5 recorded in the hologram recording medium 1 is reconstructed and a pattern corresponding to the information signal is focused on the detector array 33, whereby the hologram recording/reconstructing apparatus 20 obtains a reproduced information signal.

Further, with the hologram recording/reconstructing apparatus and method according to the present invention, since the corner cube group 35 is provided as the reflecting member, the direction in which the object light 5 is reconstructed from the hologram recording medium 1 can be kept fixed. As a result, an actuator is no longer required in the hologram recording/reconstructing apparatus, the apparatus structure can be simplified and holograms can be reconstructed in a more practical manner.

Figure 31:
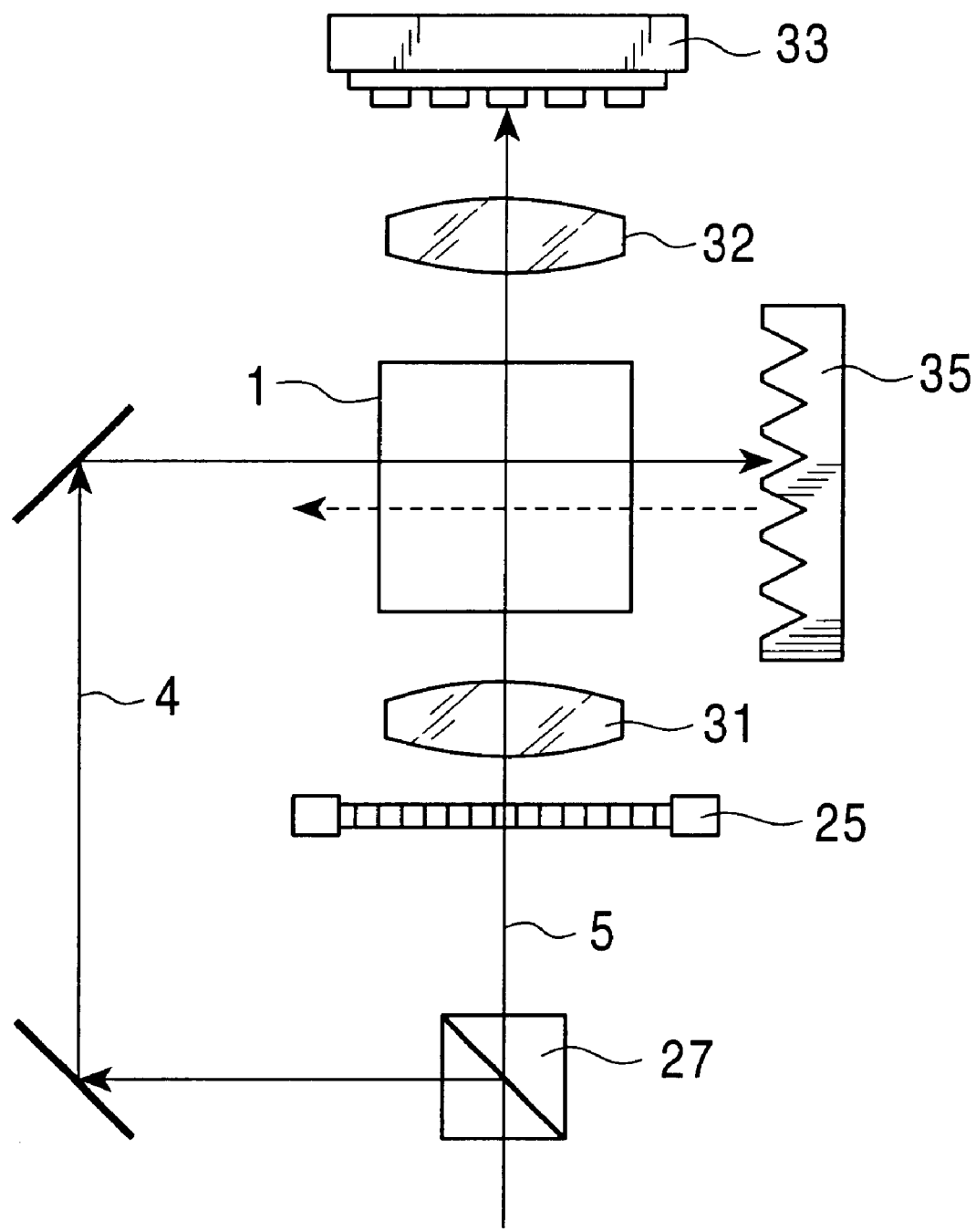
FIG. 31 is a schematic view showing one example of an arrangement of a hologram recording/reconstructing apparatus having a corner cube group according to the present invention.

FIG. 31 shows one example of an arrangement of the hologram recording/reconstructing apparatus 20 including the corner cube group 35 as the reflecting member. With the provision of the corner cube group 35, the reference light 4 is reflected by the corner cube group 35 and propagates back along the same optical path as that through which the reference light 4 has entered the hologram recording medium 1. Therefore, the phase conjugate reconstruction of holograms can be easily performed.

Figure 32:
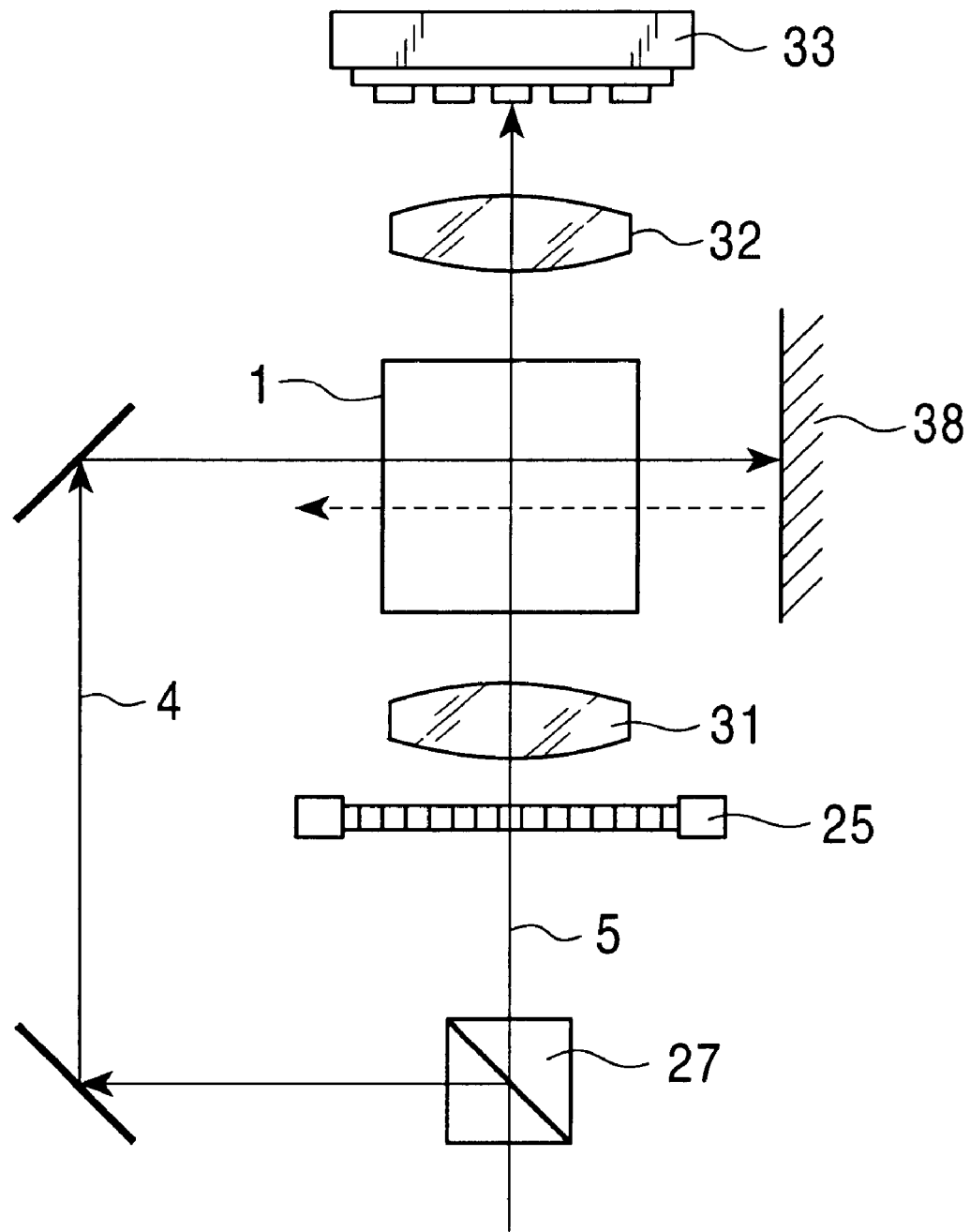
FIG. 32 is a schematic view showing one example of an arrangement of a hologram recording/reconstructing apparatus having a mirror according to the present invention.
Figure 33:
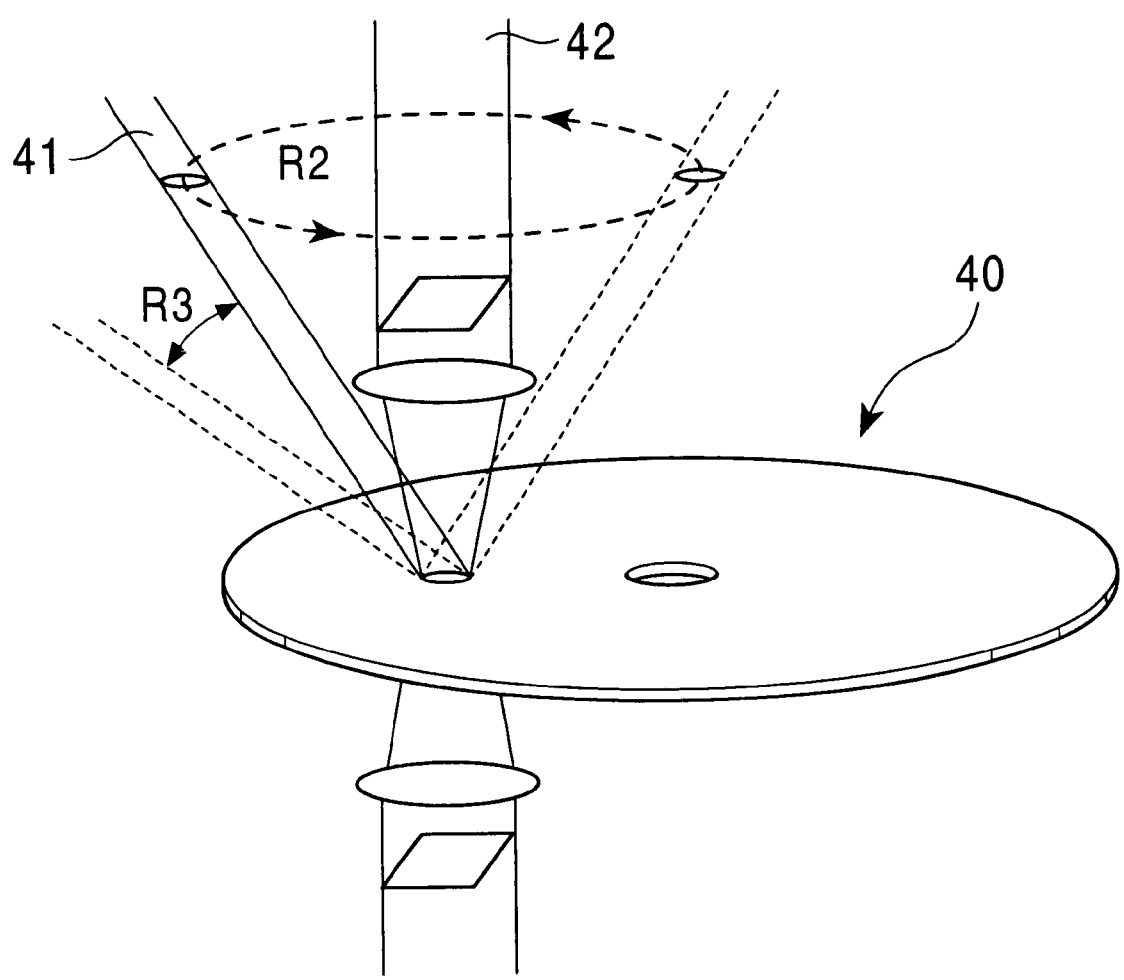
FIG. 33 is a schematic perspective view showing a conventional method for performing peristrophic multiplex recording of holograms on a hologram recording medium.

Also, as shown in FIG. 32, the hologram recording/reconstructing apparatus 20 may have a plane mirror 38 as the reflecting member. In this case, the phase conjugate reconstruction of holograms can also be performed, but the incident angle of the reference light 4 upon the hologram recording medium 1 must be changed depending on the inclining direction of the wedge substrate 3. A deflecting means, such as a beam deflector, is therefore required.

As described above, when reconstructing a transmission hologram, the propagating direction of each of the reference light 4 and the object light 5 having passed through the hologram recording medium 1 is changed with the rotation of the wedge substrate 3, and therefore the position of the detector array 33 must be moved correspondingly. However, by performing the phase conjugate reconstruction of holograms using the corner cube group 35 as shown in FIG. 28, the reconstruction light 11 can be given by the reference light 4 that is employed for recording of holograms. Accordingly, the object light 5 can be reconstructed without aberrations and can propagate back along exactly the same direction as that in which the object light 5 has entered the hologram recording medium 1.

In summary, with the hologram recording/reconstructing apparatus and method according to the present invention, holograms can be multiplex-recorded in the hologram recording medium 1 according to the present invention without requiring any deflecting means such as a beam deflector. Also, when reconstructing the recorded holograms, the phase conjugate reconstruction of the hologram can be performed using the corner cube group 35. In that case, the angle multiplex recording and/or reconstruction of holograms can be performed just by adding the corner cube group 35 with no need of using any deflecting means such as a beam deflector. It is hence possible to simplify the structure of the hologram recording/reconstructing apparatus 20, to reduce a space required for the apparatus, and to remove aberrations of the optical system.

Although the hologram recording/reconstructing apparatus and method according to the present invention requires the laser beam to be used in the form of a parallel light, a light propagating in a space causes diffraction and, exactly speaking, the wavefront of the laser beam is often not given as a plane wave. Then, in many cases, the laser beam is a Gaussian beam and has the intensity having a Gaussian distribution. Such a Gaussian beam provides a plane wave at the position of the beam waist, but the wavefront around the position of the beam waist has a small curvature. When reconstructing a hologram, therefore, a phase mismatch occurs and the diffraction efficiency deteriorates. Such an adverse effect can be reduced by arranging the corner cube 34 or the corner cube group 35 at the beam waist position of the reference light 4 where a plane wave is provided. With that arrangement, the above-mentioned adverse effect of diffraction can be minimized because the wavefront is compensated due to symmetry between before and after the reflection of the reference light 4 by the corner cube 34 or the corner cube group 35.

By thus arranging the corner cube 34 or the corner cube group 35 at the beam waist position of the reference light, a reduction in the diffraction efficiency due to a phase mismatch can be avoided. From the principle point of view, that advantage is similar to that obtained when such an arrangement is applied to the conventional angle multiplex recording of holograms. A novel feature of the hologram recording/reconstructing method according to the present invention resides in that the method of deflecting a laser beam in the conventional angle multiplex recording of holograms is replaced by rotating the wedge substrate.

Further, the hologram recording/reconstructing apparatus and method according to the present invention can be applied to any hologram multiplex recording in which the reference light 4 in the form of a plane wave is used. Examples of hologram multiplex recording, to which the present invention is applicable, include wavelength multiplex recording, peristrophic multiplex recording, fractal multiplex recording, and a combination thereof. For example, the wavelength multiplex recording can be combined with the present invention by using a plurality of laser beam sources or a wavelength-variable laser beam source. It is also conceivable to add a beam deflecting means, which deflects a beam in the radius-vector direction, to the arrangement of the hologram recording/reconstructing apparatus 20 for realizing the peristrophic multiplex recording with a higher degree of multiplexity. Thus, by applying one or combination of the above-mentioned hologram multiplex recording methods to the present invention, the degree of multiplexity in recording holograms can be increased and the recording density can be improved.

In shift multiplex recording, a converging or diverging light is employed as the reference light irradiated to a hologram recording medium in the planar form. In contrast, the present invention is featured in that the hologram recording medium 1 has a first primary surface parallel to the plane in which the hologram recording medium 1 is rotated, and a second primary surface inclined relative to the first primary surface, and a parallel light is used as the reference light 4. The multiplex recording of the present invention is similar to the peristrophic multiplex recording as one type of the angle multiplex recording, but the feature of the present invention resides in that spatial multiplex recording is simultaneously implemented because the recording position is shifted with the rotation of the hologram recording medium.

Accordingly, the hologram multiplex recording of the present invention requires neither an angle deflecting means, such as a galvanometric mirror, AOD and EOD, nor control of the focus position in the direction of an optical axis, which is required in the shift multiplex recording of holograms. As a result, the structure of the hologram recording/ reconstructing apparatus 20 can be simplified.

Further, in the hologram recording/reconstructing apparatus 20 according to the present invention, the optical system 22 may be arranged such that the object light 5 is irradiated in the direction toward the circumferential surface of the hologram recording medium 1. With such an arrangement, the recording area of the hologram recording medium 1 can be utilized three-dimensionally so as to realize a volume hologram. Note that the second embodiment of the hologram recording medium 1 is preferably adaptable for realizing the volume hologram.

Moreover, the method for generating a laser beam, which is phase conjugate to the reference light 4, for per the phase conjugate reconstruction of holograms may be realized with mixing of four optical waves. In that case, a phase conjugate light can be generated which is exactly a reversal to the reference light 4 incident upon the hologram recording medium.

The hologram recording medium 1, the hologram recording/reconstructing apparatus 20, and the hologram recording/reconstructing method according to the present invention can be applied to various fields including hologram memories, three-dimensional displays, optical interconnections, correlators, and optical computing such as novelty filtering.

The present invention has advantages as follows. The hologram recording medium according to the present invention has a first primary surface parallel to the plane in which the hologram recording medium is rotated, and a second primary surface inclined relative to the first primary surface. Therefore, the incident angles of a reference light and/or an object light upon the hologram recording medium are varied with rotation of the hologram recording medium, whereby the multiplex recording of holograms can be achieved.

Also, since the incident angle of the reference light can be varied just by rotating the hologram recording medium, it is possible to simplify the structure of a hologram recording/ reconstructing apparatus and to reduce the cost.

Further, in the case of reflecting the reference light, the phase conjugate reconstruction of holograms can be realized with such a simple arrangement as just adding a corner cube or a corner cube group made up of corner cubes arranged into an array.

With that arrangement, since aberrations occurred in an optical system are perfectly compensated, there is no need of using an expensive and large-size lens in which aberrations are highly compensated. In addition, the apparatus structure can be simplified, and a high-quality reconstruction image can be inexpensively obtained.

Moreover, with the hologram recording/reconstructing apparatus and method according to the present invention, since the hologram recording medium according to the present invention is employed, the incident angles of the reference light and/or the object light upon the hologram recording medium are varied with rotation of the hologram recording medium, whereby the multiplex recording of holograms can be achieved.

Also, since the incident angle of the reference light can be varied just by rotating the hologram recording medium, it is possible to simplify the structure of the hologram recording/ reconstructing apparatus and to reduce the cost.

Further, by employing the corner cube group, the direction in which the object light is reconstructed from the hologram recording medium can be kept fixed during the rotation of the hologram recording medium. As a result, the structure of the hologram recording/reconstructing apparatus can be simplified and holograms can be reconstructed in a more practical manner.

Thus, since the number of parts of the hologram recording/reconstructing apparatus can be reduced by the present invention, it is possible to reduce the size, the required space, and the cost of the apparatus.

What is claimed is:

1. A hologram recording medium for recording an information signal in the form of optical phase information upon irradiation of a reference light and an object light while said hologram recording medium is rotated, wherein:

said hologram recording medium has a first primary surface parallel to a plane in which said hologram recording medium is rotated, and a second primary surface inclined relative to the first primary surface, at least one of the reference light and the object light is irradiated through the second primary surface, and said hologram recording medium has light transparency allowing at least a part of the irradiated reference light and object light to pass therethrough; and said hologram recording medium is formed of a photorefractive crystal doped with a metal.

2. A hologram recording medium according to claim 1, wherein said metal is Fe, Ce, Pr, or an alloy of Fe and Mn.

3. A hologram recording medium according to claim 1, wherein said photorefractive crystal is LiNbO3 and LiTaO3.

4. A hologram recording medium for recording an information signal in the form of optical phase information upon irradiation of a reference light and an object light while said hologram recording medium is rotated, wherein:

said hologram recording medium has a first primary surface parallel to a plane in which said hologram recording medium is rotated, and a second primary surface inclined relative to the first primary surface, at least one of the reference light and the object light is irradiated through the second primary surface, and said hologram recording medium has light transparency allowing at least a part of the irradiated reference light and object light to pass therethough; and a reflective layer for reflecting the irradiated reference light and object light is disposed on the first primary surface of said hologram recording medium on the side opposite to the second primary surface to which the reference light and the object light are irradiated.

5. A hologram recording medium according to claim 4, wherein said reflective layer is formed by a corner cube group made up of corner cubes arranged into an array.

6. A hologram recording/reconstructing apparatus for recording and/or reconstructing an information signal in the form optical phase information by irradiating a reference light and an object light to a hologram recording medium, the apparatus comprising:

a driving system for rotating said hologram recording medium;

an optical system having a light source for outputting the reference light and the object light, and irradiating the reference light and the object light to a hologram recording medium having a first primary surface parallel to a plane in which said hologram recording medium is rotated, and a second primary surface inclined relative to the first primary surface, at least one of the reference light and the object light being irradiated through the second primary surface, said hologram recording medium having light transparency allowing at least a part of the irradiated reference light and object light to pass therethrough; and a control unit for controlling said driving system and said optical system wherein, said optical system includes a reflecting member for reflecting the irradiated reference light, and the reference light having passed through said hologram recording medium is reflected by said reflecting member and enters said hologram recording medium again as a phase conjugate light, thereby reconstructing an information signal in the form of optical phase information.

7. A hologram recording/reconstructing apparatus according to claim 6, wherein said reflecting member is formed by a corner cube or a corner cube group made up of corner cubes arranged into an array.

8. A hologram recording/reconstructing method for recording and/or reconstructing an information signal in the form of optical phase information by irradiating a reference light and an object light to a hologram recording medium, the method comprising the steps of:

rotating a hologram recording medium having a first primary surface parallel to a plane in which said hologram recording medium is rotated, and a second primary surface inclined relative to the first primary surface, at least one of the reference light and the object light being irradiated through the second primary surface, said hologram recording medium having light transparency allowing at least a part of the irradiated reference light and object light to pass therethrough; and irradiating the reference light and the object light onto said hologram recording medium, thereby recording and/or reconstructing an information signal in the form of optical phase information, wherein, the reference light having passed through said hologram recording medium is reflected by a mirror and propagates back along the same optical path for irradiation to said hologram recording medium again as a phase conjugate light, thereby reconstructing an information signal in the form of optical phase information.

9. A hologram recording/reconstructing method for recording and/or reconstructing an information signal in the form of optical phase information by irradiating reference light and an object light to a hologram recording medium, the method comprising the steps of:

rotating a hologram recording medium having a first primary surface parallel to a plane in which said hologram recording medium is rotated, and a second primary surface inclined relative to the first primary surface, at least one of the reference light and the object light being irradiated through the second primary surface, said hologram recording medium having light transparency allowing at least a part of the irradiated reference light and object light to pass therethrough; and irradiating the reference light and the object light onto said hologram recording medium, thereby recording and/or reconstructing an information signal in the form of optical phase information, wherein, the reference light having passed through said hologram recording medium is reflected by a corner cube or a corner cube group made up of corner cubes arranged into an array and propagates back along the same optical path for irradiation to said hologram recording medium again as a phase conjugate light, thereby reconstructing an information signal in the form of optical phase information.

10. A hologram recording/reconstructing method according to claim 9 wherein said corner cube or said corner cube group is disposed in a beam waist of the reference light and the object light having passed through said hologram recording medium.

* * * * *